United States Patent [19]

Bloomberg

[11] Patent Number: 5,181,255
[45] Date of Patent: Jan. 19, 1993

[54] SEGMENTATION OF HANDWRITING AND MACHINE PRINTED TEXT

[75] Inventor: Dan S. Bloomberg, Palo Alto, Calif.
[73] Assignee: Xerox Corporation, Stamford, Conn.
[21] Appl. No.: 627,284
[22] Filed: Dec. 13, 1990
[51] Int. Cl.⁵ ............................................. G06K 9/34
[52] U.S. Cl. ....................................... 382/9; 382/48; 382/55
[58] Field of Search ...................... 382/9, 36, 48, 55, 7

[56] References Cited

U.S. PATENT DOCUMENTS

| | | | |
|---|---|---|---|
| 3,611,291 | 10/1971 | Frank | 340/146.3 Z |
| 3,634,822 | 1/1972 | Chow | 340/146.3 S |
| 3,709,525 | 1/1973 | Frank | 283/1 |
| 4,499,499 | 2/1985 | Brickman et al. | 358/263 |
| 4,516,262 | 5/1985 | Sakurai | 382/18 |
| 4,588,211 | 5/1986 | Greene | 283/70 |
| 4,634,148 | 1/1987 | Greene | 283/70 |
| 4,724,309 | 2/1988 | Greene | 235/468 |
| 4,741,046 | 4/1988 | Matsunawa et al. | 382/9 |
| 4,817,169 | 3/1989 | Peppers et al. | 382/9 |
| 4,821,333 | 4/1989 | Gillies | 382/55 |
| 4,910,787 | 3/1990 | Umeda et al. | 382/18 |
| 4,933,979 | 6/1990 | Suzuki et al. | 382/61 |
| 4,959,868 | 9/1990 | Tanioka | 382/41 |

FOREIGN PATENT DOCUMENTS 0081767 6/1983 European Pat. Off. .
0288266 10/1988 European Pat. Off. .

OTHER PUBLICATIONS

K. Y. Wong, et al. "Document Analysis System", *IBM J. Res. Development,* vol. 26, No. 6, Nov., 1982.
Suenaga et al., "A Facsimile Based Manuscript Layout and Editing System by Auxiliary Mark Recognition," *IEEE* (1980) 2:856-858.
Suenaga, "A Facsimile Based Text Editor Using Handwritten Mark Recognition," *Proc. of 6th Int'l Joint Conf. on Artificial Intelligence,* Tokyo, Aug. 20-23, 1979, vol. 2, pp. 856-858.

Primary Examiner—David K. Moore
Assistant Examiner—Barry Stellrecht
Attorney, Agent, or Firm—Townsend and Townsend

[57] ABSTRACT

A method and apparatus for differentiating and extracting handwritten annotations and machine printed text in an image. The method provides for the use of morphological operations, preferably at reduced scale, to eliminate for example, the handwritten annotations from an image. A separation mask is produced that, for example, covers all the image pixels corresponding to machine printed text, and none of the image pixels corresponding to handwritten or handprinted annotations. The separation mask is used in conjunction with the original image to produce separate handwritten annotations and machine printed text images.

12 Claims, 25 Drawing Sheets

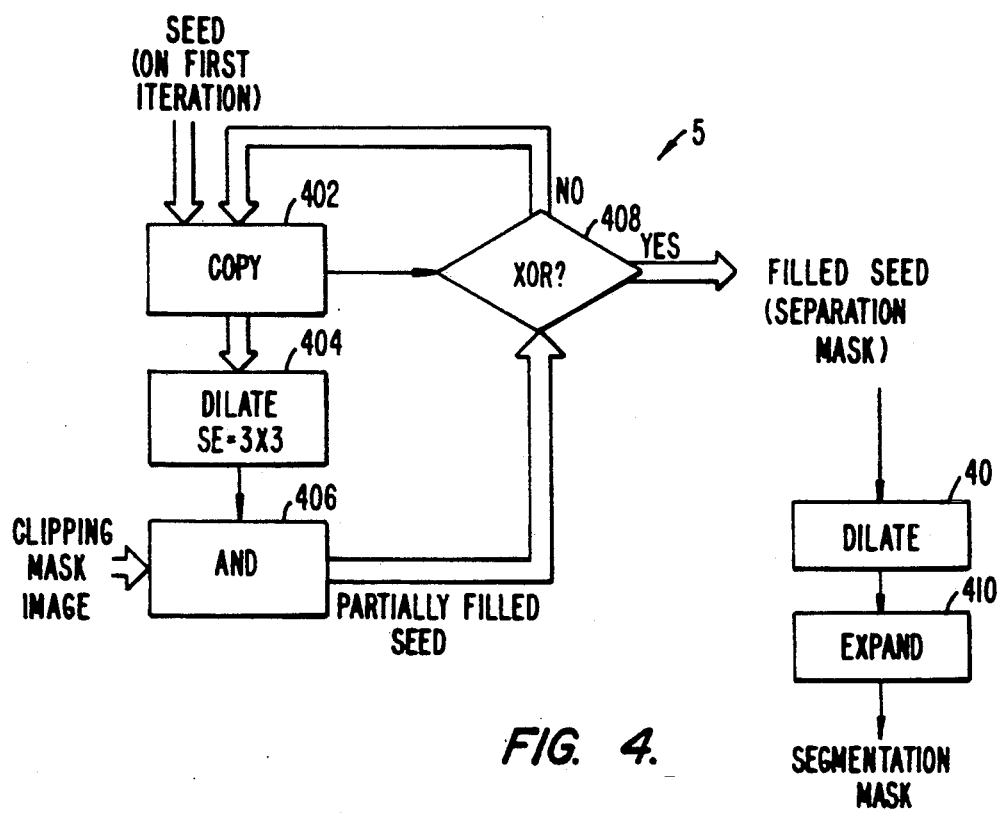
FIG. 4.
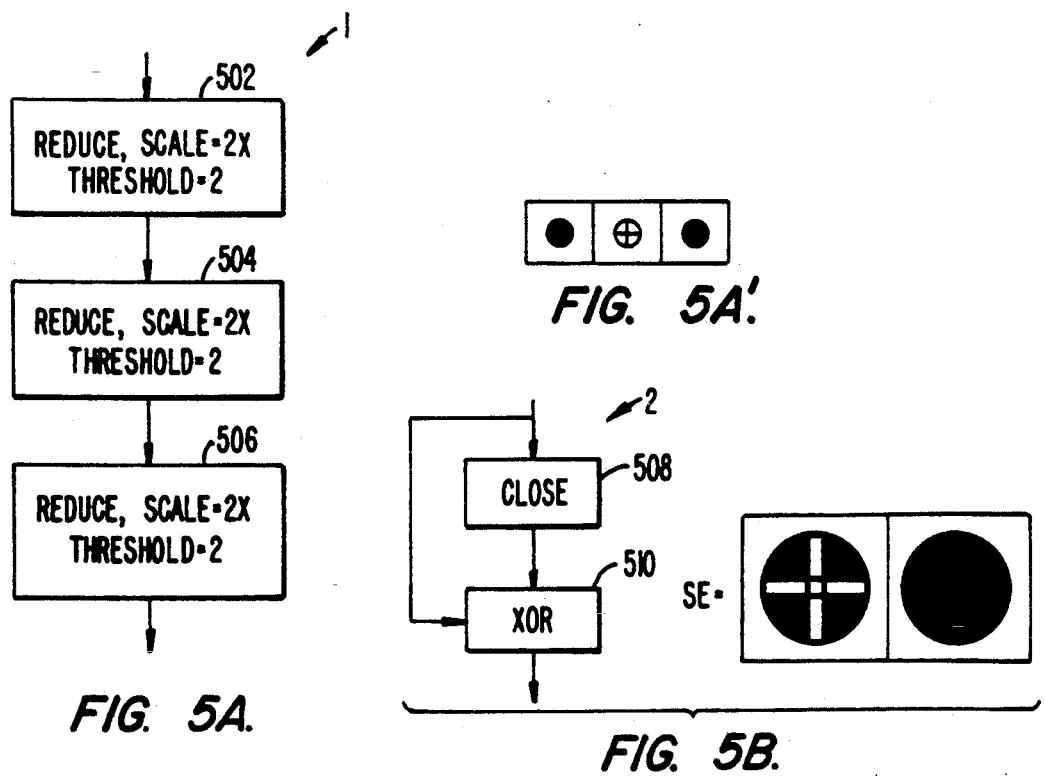
FIG. 5A.
FIG. 5A'.
FIG. 5B.

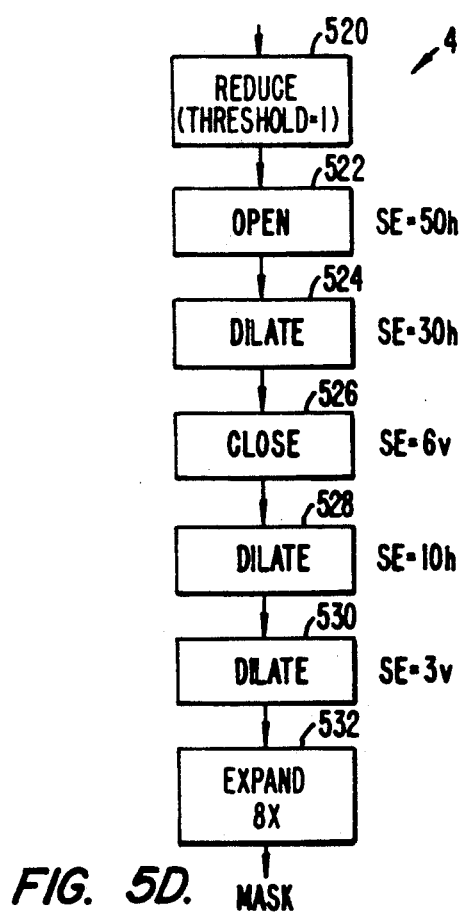
FIG. 5C.
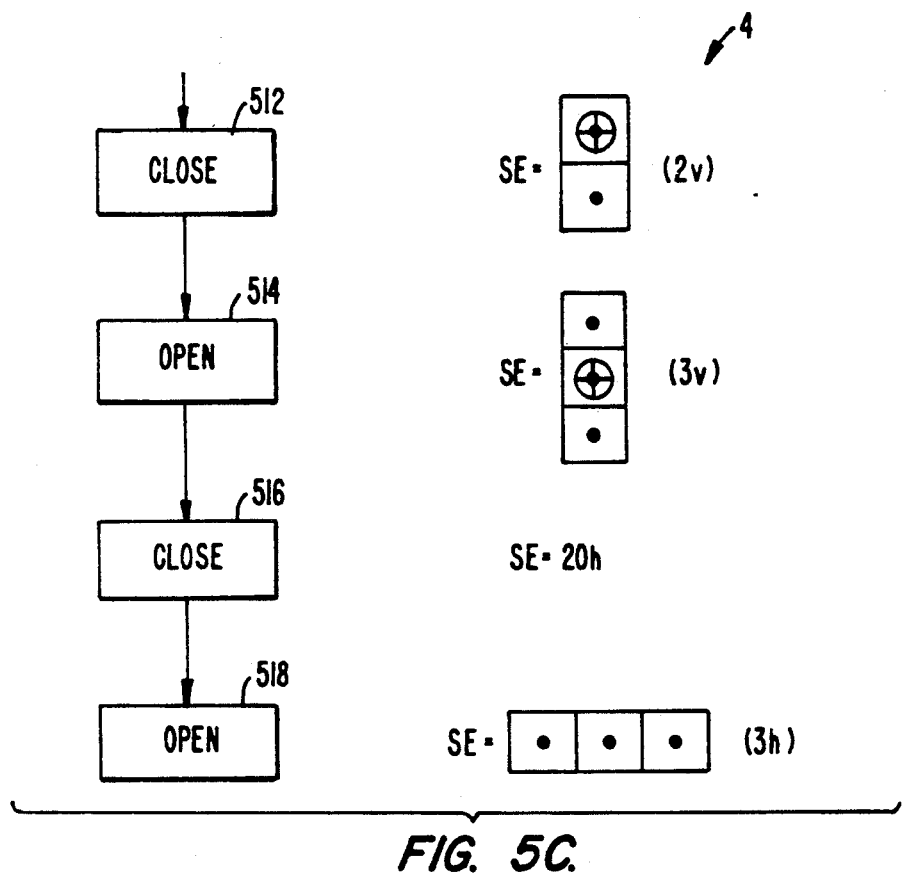
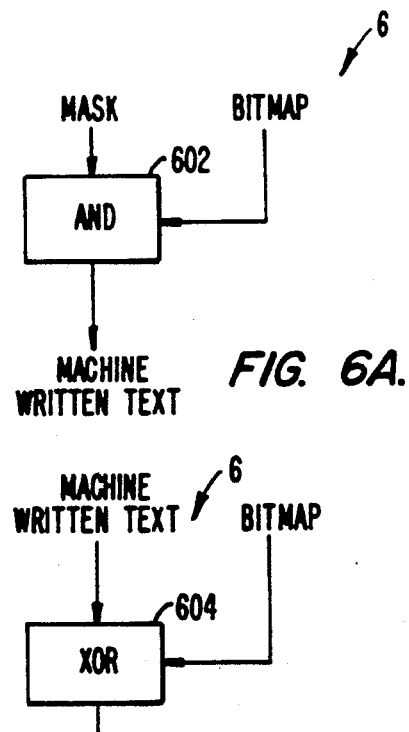
FIG. 5D.
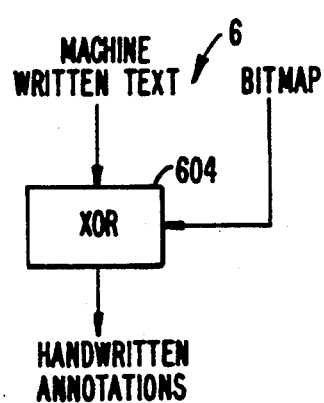
FIG. 6A.
FIG. 6B.

Information on reading digital data

Dan Bloomberg

Sept. 6, 1989

*[handwritten: Do we know of any system that has been used as an image buffer for electronic precollation?]*

1 Purpose

Addendum to information relating to IP/890524 (D/89197). This is intended to help clarify some of the procedures for finding the centers of the data marks and for finding the corners. I've included a background section lifted from the upcoming issue of *MorphBits* (Volume 5).

2 Background

*[handwritten: Why put digital data on paper? Come on — get serious!]*

One clear benefit of digital data on paper is that it augments the raster information in a scanned image, and thus aids an image interpretation system in the extraction of symbolic information.

Encoding digital data on paper has some similarities to encoding data on other media:

*[handwritten: What is characteristic about this text?]*

- The data is typically stored in a two-dimensional configuration.

- In order to read the data, one must both accurately synchronize the data with a reference "clock" and have sufficient signal to determine the data values.

But there are also many differences:

*[handwritten: MESSY Block CAPITALS / NEAT BLOCK CAPITALS]*

- Data on optical media can only be encoded using either (a) the signal value at a specific position or (b) the change in signal value (e.g., presence or absence of a signal transition) at a specific position. But

*[handwritten: neat printing is not necessarily a virtue. For example, if each character is separate, then you can't use long connected components.]*

FIG. 7A.

Information on reading digital data

Dan Bloomberg

Sept. 6, 1989

1 Purpose

Addendum to information relating to IP/89/0824 (D/89159). This is intended to help clarify some of the procedures for finding the corners of the data marks and for finding the corners. I've included a background section lifted from the upcoming issue of *Xerox Bytes* (Volume 5)

2 Background

One clear benefit of digital data on paper is that it augments the pixel information in a scanned image, and thus aids an image interpretation system in the extraction of symbolic information.

Encoding digital data on paper has some similarities to encoding data on other media:

- The data is typically stored in a two-dimensional configuration.

- In order to read the data, one must both accurately synchronize the data with a reference "clock" and have sufficient signal to determine the data values.

But there are also many differences:

- Data on optical media can only be encoded using either (a) the signal value at a specific position or (b) the change in signal value (e.g. presence or absence of a signal transition) at a specific position. But

Information on reading digital data

Dan Bloomberg

Sept. 6, 1989

Purpose

Addendum to information relating to IP/890524 (D/89197). This is intended to help clarify some of the procedures for finding the centers of the data marks and for finding the corners. I've included a background section lifted from the upcoming issue of $M_{ORPH}B_{ITS}$ (Volume 5).

One clear benefit of digital data on paper is that it augments the raster information in a scanned image, and thus aids an image interpretation system in the extraction of symbolic information.

Encoding digital data on paper has some similarities to encoding data on other media:

- The data is typically stored in a two-dimensional configuration.

- In order to read the data, one must both accurately synchronize the data with a reference "clock" and have sufficient signal to determine the data values.

But there are also many differences:

- Data on optical media can only be encoded using either (a) the signal value at a specific position or (b) the change in signal value (e.g., presence or absence of a signal transition) at a specific position. But

*FIG. 71.*

1     Do we know of any system that has been used as an image buffer for electronic precollation?

2    Background    Why put digital data on paper? Come on — get serious!

what is characteristic about this text?

MESSY BLOCK CAPITALS
     NEAT BLOCK CAPITALS neat printing is not necessarily a virtue. For example, if each character is separate, then you can't use long connected components.

*FIG. 7J.*

Information on reading digital data

Dan Bloomberg

Sept. 6, 1989

*Do we know of any system that has been used as an image buffer for electronic precollation?*

1 Purpose

Addendum to information relating to IP/890524 (D/89197). This is intended to help clarify some of the procedures for finding the centers of the data marks and for finding the corners. I've included a background section lifted from the upcoming issue of $M_{ORPH} B_{ITS}$ (Volume 5).

2 Background

*Why put digital data on paper? Come on — get serious!*

One clear benefit of digital data on paper is that it augments the raster information in a scanned image, and thus aids an image interpretation system in the extraction of symbolic information.

Encoding digital data on paper has some similarities to encoding data on other media:

*What is characteristic about this text?*

- The data is typically stored in a two-dimensional configuration.

- In order to read the data, one must both accurately synchronize the data with a reference "clock" and have sufficient signal to determine the data values.

*MESSY BLOCK CAPITALS*

But there are also many differences:

*NEAT BLOCK CAPITALS*

- Data on optical media can only be encoded using either (a) the signal value at a specific position or (b) the change in signal value (e.g., presence or absence of a signal transition) at a specific position. But

*neat printing is not necessarily a virtue. For example, if each character is separate, then you can't use long connected components.*

FIG. 7K.

Information on reading digital data

Dan Bloomberg

Sept. 6, 1990

*Do we know of any system that has been used in this way better than electronic publishing?*

1 Purpose

Addendum to information relating to IP/90684 (D/90134). This is intended to help clarify some of the procedures for finding the corners of the data masks and for finding the corners. I've included a background section lifted from the upcoming issue of Xerox Brx (Volume 3)

2 Background

*Why put digital data on paper? Can we — opt. sensors?*

One clear benefit of digital data on paper is that it augments the usual information in a scanned image, and thus aids an image interpretation system in the extraction of symbolic information.

Encoding digital data on paper has some similarities to reading data on other media:

*What is characteristic about this text?*

- The data is typically stored in a two-dimensional configuration.

- In order to read the data, one must both accurately synchronize the data with a reference "clock" and have sufficient signal to determine the data values.

*MOBY BLACK CLOTHS*

But there are also many differences:

*MEAT FLOUR CAPITAL*

- Data on optical media can only be encoded using either (a) the signal value at a specific position or (b) the change in signal value (e.g. presence or absence of a signal transition) at a specific position. But

*exact position is not necessarily — value. For example, if each chronicle is separate, then you can't use long connected components*

information on reading digital dat

Dan Bloomberg

Sept. 6, 1989

1 Purpose

Addendum to information relating to IP/890624 (D/89197). This is intended to help clarify some of the procedures for finding the centers of the data marks and for finding the corners. I've included a background section lifted from the upcoming issue of *MorphBits* (Volume 5).

One clear benefit of digital data on paper is that it augments information in a scanned image, and thus aids an image interpretation system in the extraction of symbolic information.

Encoding digital data on paper has some similarities to encoding data on

- The data is typically stored in a two-dimensional configuration.

- In order to read the data, one must both accurately synchronize the data with a reference "clock" and have sufficient signal to determine the data values.

But there are also many differences:

*NEXT BLOCK CAPITALS* be encoded using either (a) the signal value at a specific position or (b) the change in signal value (e.g., presence or absence of a signal transition) at a specific position. But

Do we know of any system that has
1.... used as an image buffer for electronic
                                    circulation?

2  Background   Why put digital data on paper? Come
                on — get serious!
                            the raster other media:    what is characteristic about this text!

MESSY Book CANVAS
                         1
• Data on optical media can only neat printing is not necessarily a virtue. For
            example, if each character is separate, then
            you can't use long connected components.

FIG. 8H.

Information on reading digital data

Dan Bloomberg

Sept. 6, 1989

*Do we know of any system that has [been] used as an image buffer for electronic [preprints]?*

1 Purpose

[redacted text]

2 Background *why put digital data on paper? Can on-get revised!*

[redacted text]

*What is characteristic about this text?*

- [redacted]
- [redacted]

*MESSY Back CHUNKS*

- [redacted]
- Data on optical media can only [redacted]

*neat printing is not necessarily a virtue. For example, if each character is separate, then you can't use long connected components.*

FIG. 8I.

SEGMENTATION OF HANDWRITING AND MACHINE PRINTED TEXT

CROSS REFERENCE TO RELATED APPLICATIONS

This application is related to application Ser Nos. 07/449,626, 07/449,263, now abandoned, and Ser. No. 07/448,193, now U.S. Pat. No. 5,131,049, all filed on Dec. 8, 1989 and assigned to the assignee of the present invention, and incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of image processing. In one embodiment the invention provides a method and apparatus for identifying and/or separating machine printed text and handwritten annotations in an image.

Many documents and their images contain both machine printed text and handwritten annotations. It would be useful to be able to identify regions of a scanned image that correspond to handwritten or hand-printed annotations. For example, current OCR systems, as well as foreseeable future OCR systems, are not able to reliably recognize handwritten annotations in an image. When such text is fed to a conventional OCR system, such systems will often produce unusable results. The performance of such systems could be improved if handwritten regions could be identified to avoid processing such regions in the OCR process.

On the other hand, identification and retrieval of handwritten annotations on documents are sometimes important. For example, an image filing system would make use of handwritten notations by saving the annotations (and their coordinates) along with an OCR-ized version of the image. In general, if the handwritten annotations are identified as such, the system can save them as bitmap data, to be fed back to the user in a way that is appropriate to the application.

While meeting with some success, prior methods of separating handwritten annotations and machine printed text have met with a variety of limitations. Some of the prior methods require equipment which is expensive, complex, and/or unreliable, while other techniques require significant amounts of computer memory, computer time, or the like. Some of the methods are less than reliable in detecting and separating handwritten annotations.

Accordingly, an improved method and apparatus are desired for detecting the presence of handwritten annotations and, if present, separating them from machine printed text in a document or image.

SUMMARY OF THE INVENTION

A method and apparatus for identifying and, optionally, separating handwritten annotations and machine printed text in an image or document are disclosed. The method requires relatively limited amounts of computer memory and processing time, while providing reliable results and requiring relatively inexpensive hardware.

In one embodiment the invention comprises, in a digital processing system, a method of identifying handwritten annotations of an input image having handwritten annotations and machine printed text areas comprising morphologically processing a region of the input image having a plurality of handwritten annotations and machine printed characters to produce a destination image, the destination image identifying substantially only the machine printed text or handwritten annotations.

A further understanding of the nature and advantages of the inventions herein may be realized by reference to the remaining portions of the specification and the attached drawings.

BRIEF DESCRIPTION OF THE DRAWINGS

FIG. 1 illustrates the invention in overall block diagrams and, in particular, FIG. 1A is a block diagram illustrating one hardware system in which the invention may be embodied while

FIG. 4 illustrates fillclipping the seed to the fillclip mask;

FIGS. 5A to 5D illustrate an alternative embodiment of mask formation;

FIGS. 6A and 6B illustrate formation of machine printed text and handwritten annotation images;

FIGS. 7A to 7K illustrate an example of operation of the first embodiment of the invention; and FIGS. 8A to 8I illustrate an example of operation of the second embodiment of the invention.

DESCRIPTION OF THE PREFERRED EMBODIMENTS

Contents

Figure 1A:
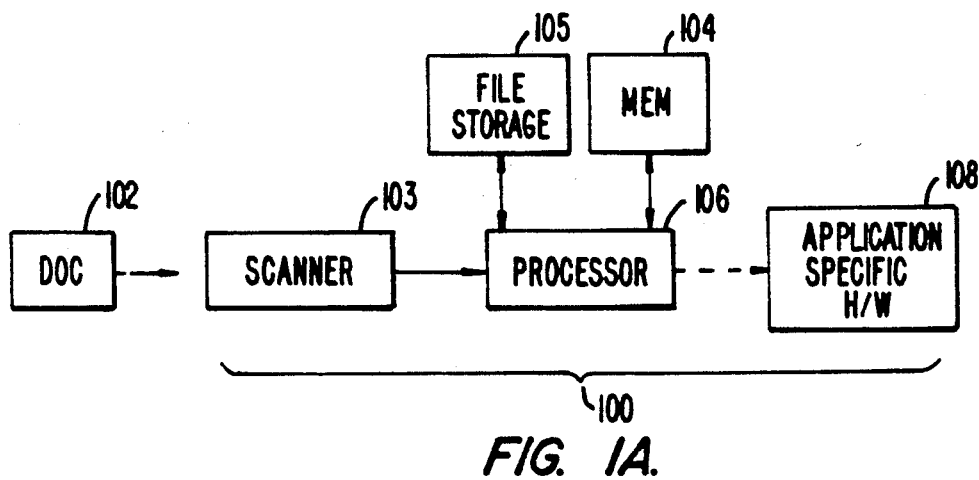

A. Definitions and Terminology
B. Overall Description of the Invention
C. Details of the Invention
  1. First Exemplary Embodiment
  2. Second Exemplary Embodiment
E. Fast Thresholded Reduction (and Expansion) of Images
F. Discussion of the Software
G. Examples of the Invention
  1. First Exemplary Embodiment
  2. Second Exemplary Embodiment
H. Conclusion

A. Definitions and Terminology

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are normally defined to be ON if they are black and OFF if they are white. The designation of black as ON and white as OFF reflects the fact that most documents of interest have a black foreground and a white background. The techniques of the present invention could be applied to negative images as well. The discussion will be in terms of black on white, but the references to ON or OFF apply equally well to images which have been inverted and, therefore, the roles of these two states are reversed. In some cases the discussion makes reference to a "don't care" pixel which may be either an ON or an OFF pixel. The invention is equally applicable to gray scale images, but the dicussion is limited to binary images for purposes of simplicity in presentation. In the context of gray scale images, ON refers to pixels above a threshold and OFF refers to pixels below a threshold.

A "morphological operation" refers to an operation on a pixelmap image (a "source" image), that uses a local rule at each pixel to create another pixelmap image, the "destination" image. This rule depends both on the type of the desired operation to perform as well as on the chosen "structuring element."

A "solid region" of an image refers to a region extending many pixels in one or two dimensions within which substantially all the pixels are ON.

A "textured region" of an image refers to a region that contains a relatively fine-grained pattern of ON and OFF pixels. Examples of textured regions are halftone or stippled regions.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an N×N square of pixels, all having the same value as the original pixel.

"Reduction" is a scale operation characterized by a SCALE factor N and a threshold LEVEL M. Reduction with SCALE=N entails dividing the source image into N×N squares of pixels, mapping each such square in the source image to a single pixel on the destination image. The value for the pixel in the destination image is determined by the threshold LEVEL M, which is a number between 1 and $N^2$. If the number of ON pixels in the pixel square is greater or equal to M, the destination pixel is ON, otherwise it is OFF.

"Subsampling" is an operation wherein the source image is subdivided into smaller (typically square) elements, and each element in the source image is mapped to a smaller element in the destination image. The pixel values for each destination image element are defined by a selected subset of the pixels in the source image element. Typically, subsampling entails mapping to single pixels, with the destination pixel value being the same as a selected pixel from the source image element. The selection may be predetermined (e.g., upper left pixel) or random.

A "4-connected region" is a set of ON pixels wherein a path can be found between any 2 pixels in the set (1) that lies entirely within the set and (2) whose steps consist of a sequence of 1-pixel steps in any of the four horizontal or vertical directions.

An "8-connected region" is a set of ON pixels wherein a path can be found between any 2 pixels in the set (1) that lies entirely within the set and (2) whose steps consist of a sequence of 1-pixel steps in any of the eight horizontal, vertical, or diagonal directions.

"Handwritten annotations" refers to portions of a document or image which are generated originally by human writing with a pen, pencil, or the like, although this term will also refer to machine reproduced versions of such writing including xeroxographic copies, printed reproductions, or the like. A resulting image contains substantially only handwritten annotations when portions of machine printed text such as 70%, 80%, 90%, 95%, 97%, 99%, or more of machine printed text has been removed from an original image while leaving a greater portion of handwritten annotations.

"Machine printed text" refers to printed portions of a document or image containing highly regular characters and spacing, frequently generated by, for example, a printer such as a computer printer or printing press, or the like. An image contains substantially only machine printed text when portions of handwritten annotations such as 70%, 80%, 90%, 95%, 97%, 99%, or more of handwritten annotations has been removed from an original image while leaving a greater portion of machine printed text.

A "line-adjacency graph" (LAG) is a data structure representing a binary image which has a tree form with generally three levels in the hierarchy. The three levels are (i) runs of adjacent ON pixels in a scanline, (ii) strokes composed of connected runs, and (iii) the isolated marks (e.g., letters) composed of connected strokes.

A "structuring element" (SE) refers to an image object of typically (but not necessarily) small size and simple shape that probes the source image and extracts various types of information from it via the chosen morphological operation. In the attached figures that show SEs, a solid circle is a "hit," and an open circle is a "miss." The center position is denoted by a cross. Squares that have neither solid nor open circles are "don't cares"; their value in the image (ON or OFF) is not probed. A binary SE is used to probe binary images in a binary morphological operation that operates on binary input images and creates an output binary image. A binary SE can also be used to probe grayscale images, in which case it is viewed as a moving window that is shifted to all places of the source image. The SE is defined by a center location and a number of pixel locations, each normally having a defined value (ON or OFF). The pixels defining the SE do not have to be adjacent each other. The center location need not be at the geometrical center of the pattern; indeed it need not even be inside the pattern. A "solid" SE refers to an SE having a periphery within which all pixels are ON. For example, a solid 2×2 SE is a 2×2 square of ON pixels. A solid SE need not be rectangular. A horizontal SE is generally one row of ON pixels and a vertical SE is generaly one column of ON pixels of selected size.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image. An erosion will give one pixel in the destination image for every match. That is, at each pixel, it outputs 1 if the SE (shifted and centered at that pixel) is totally contained inside the original image foreground, and outputs 0 otherwise.

"Dilation" is a morphological operation wherein a given pixel in the source image being ON causes the SE to be written into the destination image with the SE center at the corresponding location in the destination image. The SEs used for dilation typically have no OFF pixels. The dilation draws the SE as a set of pixels in the destination image for each pixel in the source image. Thus, the output image is the union of all shifted versions of the SE translated at all 1-pixels of the original image.

"Opening" is a morphological operation that is equivalent to an erosion followed by a dilation. The result is to replicate the SE in the destination image for each match in the source image. The erosion replicates the SE in the destination image for each match.

"Closing" is a morphological operation equivalent to a dilation followed by an erosion. A close of an image is also equivalent to the bit inverse of an open on the (bit inverse) background.

"Fill8" refers to an image operation in which 8-connected regions are filled to rectangular bounding boxes.

"Fillclip" is a morphological operation in which seed pixels are filled to a clipping image (also called "clipping mask").

A "mask" refers to an image, normally derived from an original image, that typically contains regions of ON pixels corresponding to regions of interest in the original image. It will be understood that in the case of a clipping mask, certain regions of ON pixels will not contain seed pixels.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

B. Overall Description of the Invention

FIG. 1A is a block diagram of an image analysis system 1 within which the present invention may be embodied. The basic operation of system 100 is to extract or eliminate or simply identify the presence or absence of certain characteristic portions of a document 102, in this case handwritten or machine printed text. To this end, the system includes a scanner 103 which digitizes the document on a pixel basis, and provides a resultant data structure. Depending on the application, the scanner may provide a binary image (a single bit per pixel) or a gray scale image (a plurality of bits per pixel). This data structure contains the raw content of the document, to the precision of the resolution of the scanner. This data structure, typically referred to as an image, may be sent to a memory 104 or stored as a file in a file storage unit 105, which may be a disk or other mass storage device.

A processor 106 controls the data flow and performs the image processing. Processor 106 may be a general purpose computer, a special purpose computer optimized for image processing operations, or a combination of a general purpose computer and auxiliary special purpose hardware. If a file storage unit is used, the image is transferred to memory 104 prior to processing. Memory 104 may also be used to store intermediate data structures and possibly a final processed data structure.

The result of the image processing, of which the present invention forms a part, can be a derived image, numerical data (such as coordinates of salient features of the image) or a combination. This information may be communicated to application specific hardware 108, which may be a printer, display, optical character recognition system, graphics recognizer, electroreprographic copier, or the like, or may be written back to the same or a different file storage unit 105.

The invention utilizes specialized reduction procedures and morphological operations to transform regions according to their texture in such a way as to identify and/or remove handwritten or machine printed portions of an image. In preferred embodiments the machine printed regions are identified and, ultimately, coalesced into a separation mask of solid or nearly solid ON pixels. Thus, handwritten portions of an image can either be removed, while retaining machine printed text or, conversely, machine printed text can be removed, while retaining the handwritten annotations. Of course, in some embodiments it will be desirable to simply identify the presence or absence of machine printed text or handwritten annotations.

In preferred embodiments large solid ON regions of an image (i.e., regions having run lengths of ON pixels over a substantially greater distance than the text or graphics in the image) and finely textured regions (such as half tones or stipples) are first removed from the image. A variety of methods are available for removal of such regions, but in preferred embodiments such regions are removed according to one of the methods disclosed in U.S. application Ser. No. 07/449,624, now U.S. Pat. No. 5,065,437 and Ser. No. 07/4448,193, now U.S. Pat. No. 5,131,049 which are assigned to the assignee of the present invention and incorporated herein by reference for all purposes. The remaining image contains primarily or exclusively handwritten and/or machine printed text. Of course such removal step is optional, particularly when images to be processed are not expected to contain solid black, stippled, or finely textured regions.

Figure 1C:
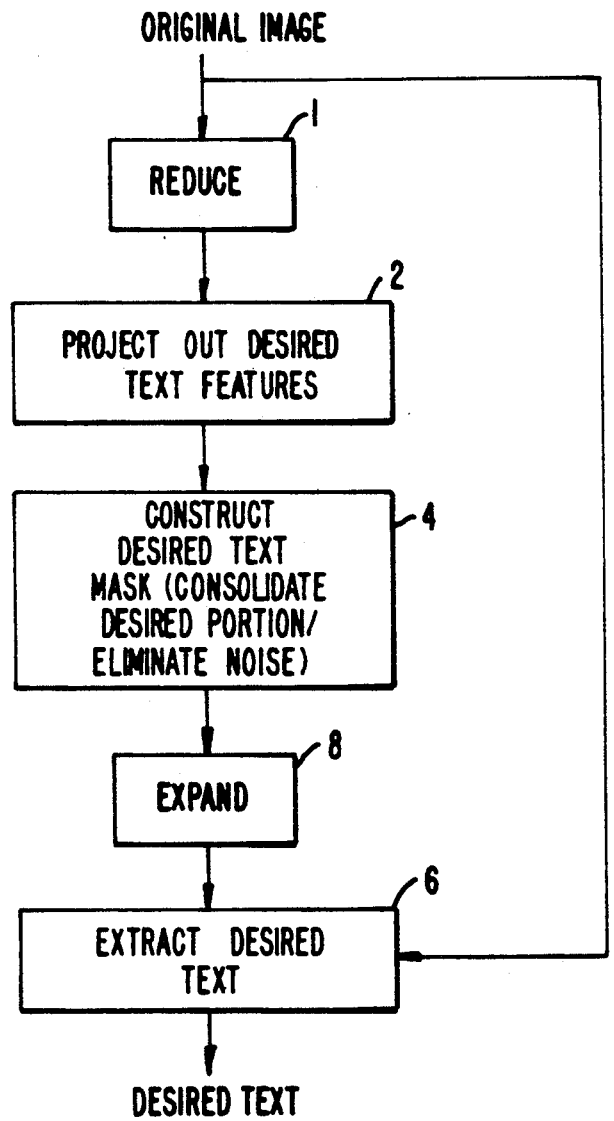
FIGS. 1B and 1C are overall flowcharts illustrating operation of the invention.
Figure 1B:
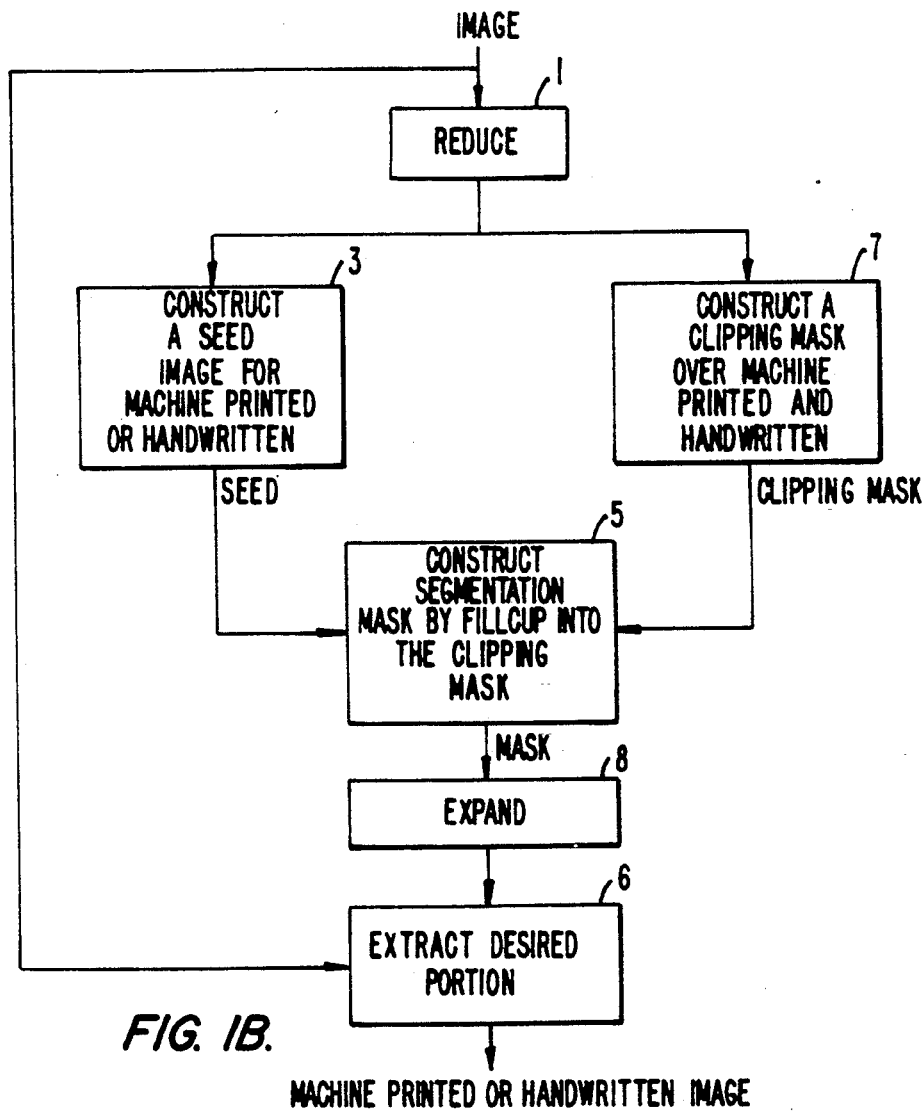

FIGS. 1B and 1C are overall flow diagrams illustrating two particular embodiments of the invention as it is used to process an input binary or gray scale image, which has preferably had finely textured regions removed according to the above methods. Referring to FIG. 1B, in preferred embodiments the process begins with one or more optional reduction steps 1. The invention is illustrated herein primarily by way of reduced scale operations since reduced scale operations operate in an efficient manner and more readily segregate handwritten and machine printed text. Of course, the invention need not be operated at reduced scale but could instead be conducted entirely at full scale. In some embodiments, separate reductions are performed to create a fillclip mask and a text seed so that different thresholds may be utilized.

In step 3 a reduced noise text seed is formed having a relatively sparse density of pixels substantially only in, for example, the machine printed areas. The text seed, in a preferred embodiment, is formed by morphologically processing the image to identify regions with the characteristic features of handwritten annotations or machine printed text. According to a preferred embodiment, the system identifies regions in which OFF pixels are laterally bounded on two sides by OFF pixels.

In step 5, the system fillclips the text seed to a fillclip mask formed in step 7 from the original image. The fillclip mask is an image containing substantially solid regions of ON pixels covering both the handwritten annotations and machine printed text. The result of the fillclip operation in step 5 is a desired text mask which the system uses to extract the desired machine printed or handwritten annotations in step 9 by, for example, ANDing a version of the mask which has been expanded (as in step 8) with the original image or by ANDing the reduced version of the mask with the reduced original image.

FIG. 1C illustrates an alternative embodiment of the invention. The image is reduced, as in the first embodiment, in step 1 and in step 2 the original image is processed with an appropriate structuring element to remove a large portion of the pixels in portions of the image which are not in either machine printed or handwritten format, and/or consolidate portions of the image which are in machine printed or handwritten format. Like the first embodiment, the system identifies machine printed text or handwritten annotations by selecting regions where a characteristic feature is present in a quantity greater than the background "noise" level. According to specific embodiments of the invention, the system identifies machine printed text regions with a structuring element which selectively identifies regions in which ON pixels are laterally bounded on two sides by OFF pixels.

In step 4 the output from step 2 is processed to consolidate the remaining ON pixels in desired regions and eliminate ON pixels in remaining regions so as to form a mask. The mask will consist primarily of areas of ON pixels in regions of the desired format of machine printed text or handwritten annotations. The mask is then expanded back to the original scale in step 8 and, in optional step 6, the mask is used to extract only those portions of the original image which contain the desired machine printed text or handwritten annotations. This step may use, for example, an AND operation between the original image and the mask. The output of step 6 is portions of an image which are in machine printed or handwritten format.

The invention uses morphological image processing of a region of an image containing multiple characters. In most preferred embodiments, the method is used to process most or all of the pixels in an image (where the image may of course comprise only a portion of the image of an entire document). Therefore, rapid and reliable processing of entire document images (or substantial portions thereof) may be attained.

C. Details of the Invention

The present invention utilizes differences in shape and/or texture of machine printed text and handwritten annotations to identify such machine printed text and/or handwritten annotations. By "shape" it is intended to mean herein the outlining shape of characters, words, and/or groups of words in handwritten or machine printed format. By "texture" it is intended to mean the patterns of ON and OFF pixels within regions of the machine printed text or handwritten annotations.

Several techniques are available for segregating such text. For example, the "density" of lines of ON pixels in various orientations may be utilized to initially screen the text for handwritten annotations or machine printed text, handwritten annotations containing substantially greater concentrations of lines at various skewed angles from vertical. Alternatively, the system may utilize the "size" of connected components within the image to provide an initial screening of the text, machine printed text having substantially smaller connected components.

While the above examples give reasonable results, preferred embodiments of the invention utilize textural differences. Particularly, when the system reduces an image containing machine printed text and handwritten annotations to, for example, a resolution of 38 pixels/inch, the two types of writing are texturally quite different. Preferred embodiments of the invention utilize a morphological texture sieving operation to extract and amplify these differences.

1. First Exemplary Embodiment

As shown in FIG. 1B, preferred embodiments of the invention form a text seed and a clipping mask system, and then fill the text seed up to the boundaries of the clipping mask.

Figure 2:
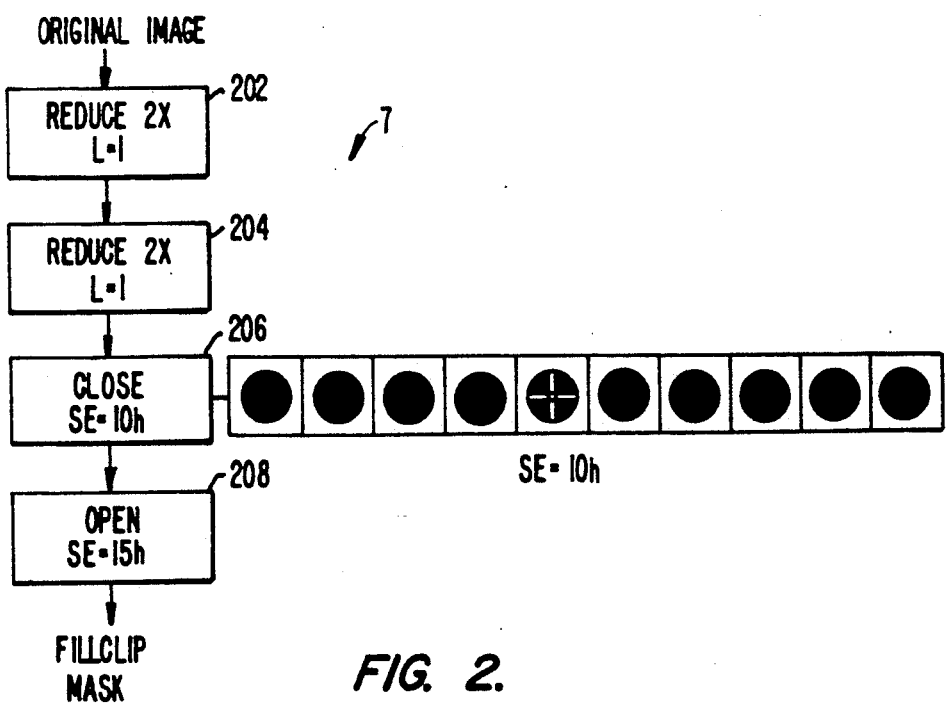
FIG. 2 illustrates a method of forming a fillclip mask.

FIG. 2 illustrates the formation of a fillclip mask, as shown in step 7. The original image is reduced two times at steps 202 and 204, using, for example, threshold LEVEL=1. Therefore, an input image of 150 pixels/inch is now at a scale of about 38 pixels/inch. The system then CLOSEs the image at step 206 using a large horizontal SE (e.g., 10h) and then OPENs the image 30 at step 208 using a large horizontal SE (e.g., 15h). The CLOSE joins separate words and the OPEN removes any small vertical "filaments" such that later filling of the seed into the mask does not result in any leakage from the machine printed text regions into handwritten annotation regions.

Figure 3:
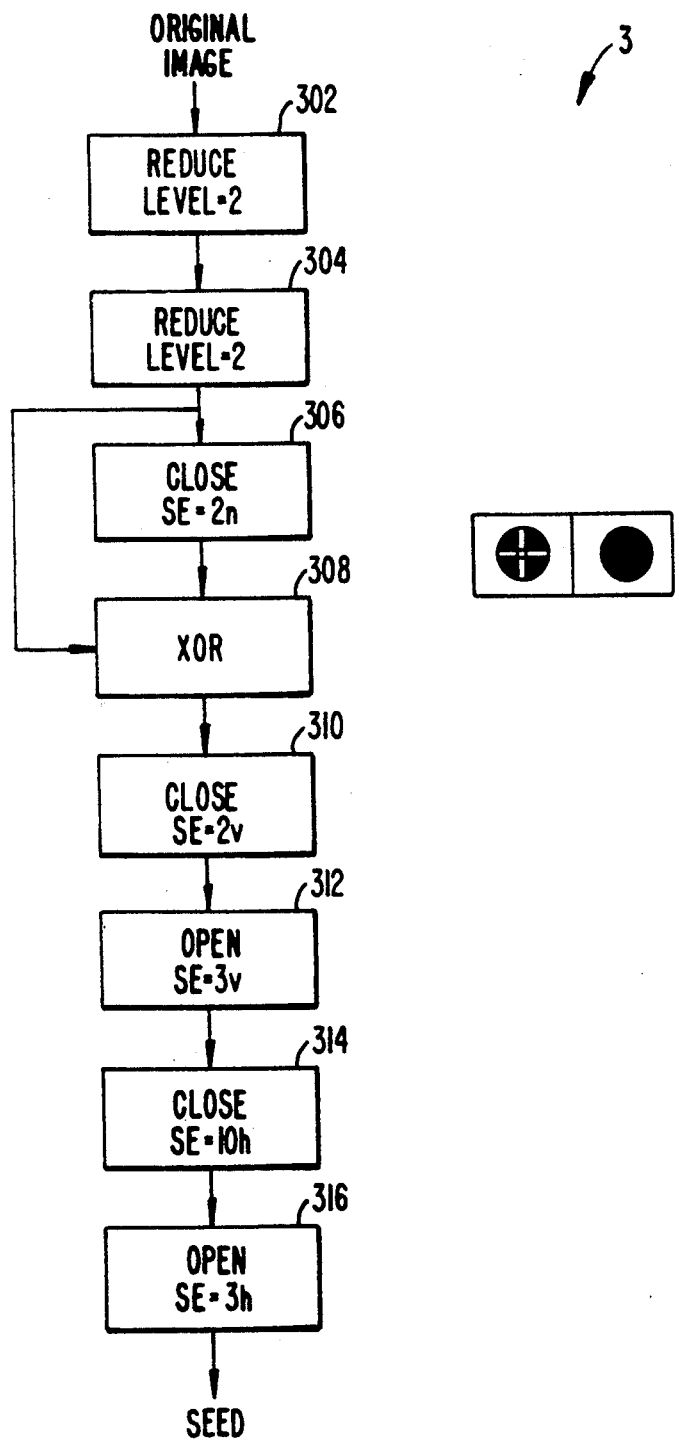
FIG. 3 illustrates formation of a machine printed text seed.

FIG. 3 illustrates the process of constructing a text seed and eliminating noise as shown in step 3. In step 302 the original image is optionally reduced using a threshold LEVEL=2. The image is then again optionally reduced at step 304 using LEVEL=2. Therefore, an input image of 150 pixels/inch is now at about 38 pixels/inch.

At step 306 the reduced image is then CLOSEd using a 2h SE. At step 308 the input to and the output from the CLOSE are XOR'd at step 308, the output being an image with relatively few pixels in handwritten annotation areas and a relatively large number of pixels in machine printed text areas, since the image has been processed to identify only those areas in which there are horizontal gaps with a width of one pixel. It will be recognized that other SEs will be used in particular embodiments, particularly in non-reduced images in which the gaps would be larger than one pixel.

In regions where ON pixels are still contained in handwritten annotation areas, the regions will tend to be only one pixel high (at this particular resolution of 38/inch) and accordingly at step 310 is CLOSEd with a small vertical SE (e.g., 2v) and then OPENed at step 312 with a slightly larger vertical SE (e.g., 3v).

The resulting image will generally contain only a few horizontally isolated pixels in handwritten annotation regions at this stage and these are now substantially removed. This is done by performing a horizontal CLOSE/OPEN. For example, at step 314 the image is now CLOSEd with an SE of, for example, 10h followed by an OPEN 316 with an SE of, for example, 3h. The resulting image will contain groupings of ON pixels in machine printed text regions with relatively few or no ON pixels in handwritten annotation regions.

FIG. 4 illustrates the fillclip operation 5 in greater detail. In step 402 the seed image is stored. The system then DILATEs the image at step 404 using, for example, a 3×3 SE. The result of step 404 is then AND'd at step 406 with the mask image resulting from step 208. The result of the AND is compared to the copied image at step 408 using, for example, a XOR and, if the image has not changed from the previous iteration, the filled seed is output as the text mask. If the image is still changing from a previous iteration, the process is repeated copying the last iteration and using the last iteration in the DILATION step 404. After the image stops changing, the output will be a mask which can be processed to remove the desired text, optionally with an EXPAND step 518 to return to the original scale. Preferably, the EXPAND is preceded by a DILATE 409 which ensures that the mask covers desired pixels in the original image.

The operations used herein satisfy two properties that make it easy for us to visualize their geometrical behavior. First, EROSION, DILATION, OPEN, and CLOSE are "increasing" operations, which means that if image 1 is contained in image 2, then any of these morphological operations on image 1 will also be contained in the morphological operation on image 2. Second, CLOSE is extensive and OPEN is antiextensive. This means that the original image is contained in the image transformed by CLOSE and the image transformed by OPEN is contained in the original image. The DILATION and EROSION operations are also extensive and antiextensive, respectively, if the center of the SE is contained within the original image.

The OPEN and CLOSE operations used herein also satisfy additional desirable properties. For example, the result of the operation is independent of the position of the center of the SE. Further, the operation is idempotent, which means that re-applying the OPEN or CLOSE to the resulting image will not change it.

2. Second Exemplary Embodiment

FIGS. 5A to 5D illustrate in greater detail one embodiment of the operations shown in FIG. 1C. In particular, FIG. 5A illustrates a preferred embodiment of the optional reduction step 1 in greater detail. The particular input image herein is at a resolution of 150 pixels/inch. An image at higher resolution requires proportionately more reduction, whereas an image at lower resolution requires less reduction or, alternatively, the use of appropriately scaled structuring elements. At step 502 the system performs a first thresholded reduction. According to most preferred embodiments the first thresholded reduction is performed with a scale of 2× and a threshold level of 2. Thereafter, the system preferably performs a second reduction 504 with a scale of 2× and a threshold of 2 and, in some embodiments, a third reduction 506, also with a scale of 2× and a threshold level of 2.

FIG. 5B illustrates step 2 in greater detail in which the desired text portions, in this case the machine printed text, are selectively projected and the undesired portions are substantially eliminated. At step 508 the system CLOSEs the reduced image using the exemplary SE shown in the right hand portion of the figure. The SE in this particular example is a horizontal SE of length 2 (the center of the SE is shown with the cross hair pixel). When the image is CLOSEd using this SE (like the first embodiment), all OFF pixels that have at least one ON pixel laterally adjacent both to the left and right are turned ON. Then, a XOR with the original image leaves just those pixels that were turned ON by the CLOSE operation. Thereafter, at step 510, the output from step 508 is XOR'd with the input to step 508 resulting in substantially larger and denser regions of ON pixels in areas of machine printed text than handwritten annotations.

Alternatively, a hit-miss operation on the original image with a hit-miss SE will extract the same set of pixels and can substitute for the two steps 508 and 510. The hit-miss operation, using this SE, yields an image with ON pixels only in positions where an OFF pixel is surrounded laterally by ON pixels, as graphically illustrated by the SE itself. Of course, other morphological operations may be used in which the system identifies regions where OFF pixels are bounded on each side by ON pixels. For example, a hit-miss SE, shown in FIG. 5A, with an OFF pixel in the center and laterally adjacent ON pixels would perform the same function.

FIG. 5C illustrates a process of consolidating the desired features and forming the mask as shown in step 4 in greater detail. These steps take advantage of the fact that the image output from step 510 will be horizontally sparse and vertically, in most cases, only about 1 pixel high in handwritten regions. Therefore, at step 512 the output from step 510 is CLOSEd with the SE shown in the figure, i.e., a vertical SE having a height of 2. Thereafter, at step 514 the image is OPENed with a vertical SE, preferably with a height greater than that of the preceding CLOSE, such as a 3v SE. The CLOSE of step 512 takes advantage of the fact that there will tend to be many pixels in the machine printed text part of the image that are vertically aligned, some of which are separated by a single pixel gap. Such pixels are, therefore, joined together before performing the OPEN, which does not remove the joined set.

Thereafter, in step 516, the system performs an operation which makes long horizontal lines of ON pixels in the machine printed portions of the text. In the particular embodiment shown in FIG. 5C the operation is a CLOSE with a 20h (20 horizontal ON pixels) SE. Thereafter, at step 518, the few remaining ON pixels in maps of the handwritten portions are removed using an OPEN with a 3h SE.

FIG. 5D illustrates the remaining steps needed for formation of a mask. At step 520 the system again optionally reduces the image (2×) using a threshold of, for example, 1. Using a 150 pixel/inch input image, the image will now be at a scale of about 19 pixels/inch. Thereafter, at step 522 the image is OPENed with a large solid horizontal SE (of length 50 in this example), followed by a DILATION at step 524 with a solid horizontal SE of length 30.

Next, at step 526 the image is CLOSEd with a vertical SE of height 6. To fill the mask further, a horizontal DILATION with a SE of length 10 is performed at step 528, followed by a vertical DILATION with a SE of height 3 at step 530. The system then magnifies the mask 8 times, to the original resolution of 150/inch using an EXPAND at step 532.

FIG. 6A illustrates one embodiment of step 6 in which the system extracts the desired text (in this case the machine printed text) from the image. At step 602 the mask is AND'd with the original bitmap image. The output will be substantially or entirely machine printed text.

FIG. 6B illustrates a technique for extracting handwritten annotations. According to this process the machine printed text image from the output of step 602 is XOR'd at step 604 with the original bitmap image. The output of this operation will be substantially or entirely handwritten annotations.

E. Fast Thresholded Reduction (and Expansion) of Images

One requirement of efficient segmentation, is that thresholded reduction must be done quickly, Copending application Ser. No. 07/449,263, now abandonded, assigned to the assignee of the present invention and incorporated herein by reference for all purposes, describes preferred methods and devices for performing fast thresholded reductions and expansions of images.

F. Discussion of the Software

Table 1 (© Copyright 1991, Xerox Corporation) provides a program script for implementation of the first embodiment of the invention provided herein, and Table 2 (© Copyright 1991, Xerox Corporation) provides a program script for implementation of the second embodiment of the invention herein. The program scripts are executed sequentially by an interpreter, that invokes procedures written in the "C" language to carry out image transformations. Table 3 illustrates the actions taken in a C computer program based on the script calls. Routines for specific operations used herein such as CLOSE, OPEN, and the like are provided in copending application Ser. No. 07/449,263, previously incorporated herein by reference for all purposes.

The programs have been demonstrated on Sun workstations, although it will be apparent to those of skill in the art that a wide variety of programming languages and hardware configurations could readily be used based on this disclosure without departing from the scope of the invention. Further, while the invention is illustrated herein primarily with regard to implementations in a programmed digital computer, other implementations will be immediately apparent. For example, the invention could be implemented in other digital processing systems such as one formed from discrete hardware components, or a combination of hardware and software components.

TABLE 1

Program for Separation of Handwritten
Annotation and Machine Printed Text
(First Embodiment)

* Extraction at 38/in.
* (a) Find horizontal gaps of width 1.
* (b) Make a seed within machine printed regions.
* (c) Make a clipping mask over the entire image.
* (d) Fill the seed into the clipping mask to form a segmentation mask.
* (e) Extract the regions of the original image using the segmentation mask.

moveToScale(1)
* input image at resolution of 150/inch. Reduce to 38/in
* using threshold value of 2.
reduceSelect (1, 0, 0, 0, 0, 0, 0, 2)
reduceSelect (1, 0, 0, 0, 0, 0, 0, 2)
* find horizontal gaps of width exactly equal to 1
pause(" find small horizontal gaps")
close(pr1, pr0, strel2h)
xor2(pr1, pr0)
copy(pw0, pr1)
* note that for CLSOING with strel2h, the pixel density is very low in
* the handwritten areas. Also, the components in handwritten areas
* are typically only one pixel high. Therefore, a small vertical
* CLOSE/OPEN will remove most of the pixels remaining in the handwritten
* areas.

TABLE 1-continued

Program for Separation of Handwritten
Annotation and Machine Printed Text
(First Embodiment)

pause(" emphasize the textural difference")
close(pr3, pr1, strel2v)
open(pr2, pr3, strel3v)
copy(pw0, pr2)
* there are only a very few horizontally-isolated pixels remaining
* in the handwritten areas. To remove them, while retaining
* the higher density of pixels in the machine printed areas,
* do a horizontal CLOSE/OPEN. This solidifies machine printed
* areas and removes the handwritten areas entirely.
pause (" remove noise; solidify machine printed areas; get the seed")
close(pr1, pr2, strel10h)
open(pr1, pr1, strel3h)
copy (pw0, pr1)
* To make the clipping mask at 38/inch, reduce with threshold 1
* (to guarantee pixel coverage).
* Follow this by a horizontal CLOSE to join separate words,
* because we cannot expect to have seeds in each word.
* Finally, do a horizontal OPEN to remove any small vertical filaments
* that may exist between parts of the mask corresponding to machine
* and handwritten image. These filaments must be removed so that
* subsequent filling of the seed into the mask does not leak from
* parts of the clipping mask that cover machine printed regions
* into parts of the clipping mask that cover handwritten or
* handprinted regions.
pause(" make the clipping mask")
moveToScale(1)
reduceSelect(1, 0, 0, 0, 0, 0, 0, 1)
reduceSelect(1, 0, 0, 0, 0, 0, 0, 1)
close(pr4, pr0, strel10h)
open(pr4, pr4, strel5h)
copy(pw0, pr4)
* Fill the seed into the clipping mask, to produce the segmentation
* mask. Follow this by a small DILATION to ensure that the
* segmentation mask entirely covers the corresponding pixels in
* the original image.
pause(" fill seed into mask")
fillClip(pr5, pr1, pr4)
dilate(pr3, pr5, strel5)
copy(pw0, pr3)
* expand the mask to full size and extract the machine printed and
* handwritten parts of the original image.
pause(" expand to full size and extract")
expandSelect(0, 0, 0, 1, 0, 0, 0, 1)
and(pr1, pr0, pr3)
copy(pw0, pr1)
xor(pr2, pr1, pr0)
copy(pw0, pr2)
xor2(pr3, pr0)
copy(pw0, pr3)
* reduce 2x to show
pause(" reduce 2x to show")
reduceSelect(1, 1, 1, 1, 0, 0, 0, 2)
copy(pw0, pr1)
copy(pw0, pr2)
copy(pw0, pr3)

( © Copyright 1991, Xerox Corporation)

TABLE 2

Program For Separation of Handwritten
Annotation and Machine Printed Text
(Second Embodiment)

* Extraction at 38/inch, looking for horizontal gaps of width 1.
* Then solidify for mask of machine printed part at 19/inch.

```
moveToScale(1)
    * reduction to 38/in
reduceSelect(1,0,0,0,0,0,2)
reduceSelect(1,0,0,0,0,0,2)
    find width = 1 horizontal gaps
pause("find small horizontal gaps")
close(pr2, pr1, strel2h)
xor2(pr2, pr1)
copy(pw2, pr2)
    * note that for closing with strel2h, the texture
is very weak in
    * the handwritten areas. In particular, it is
typically only one
    * pixel high, so use a vertical close/open
pause("emphasize the textural difference")
close(pr4, pr2, strel2v)
open(pr3, pr4, strel3v)
copy(pw3, pr3)
    * now do a larger horizontal close/open to
solidify
    * machine printed areas and remove handwritten
        areas entirely.
pause(" solidify machine printed areas")
close(pr5, pr3, strel20h)
open(pr4, pr5, strel3h)
copy(pw4, pr4)
    * solidify further: the large dilate is
necessary because of the loss of
    * pixels near the LH boundary ont the erosion
step of the previous close!
pause(" reduce and further solidify")
reduceSelect(0, 0, 1, 0, 0, 1)
close(pr6, pr4, strel50h)
dilate(pr5, pr6, strel30h)
copy(pw5, pr5)
close(pr6, pr5, strel6v)
copy(pw6, pr6)
dilate(pr2, pr6, strel10h)
dilate(pr3, pr2, strel3v)
copy(pw3, pr3)
    * expand to full size
pause(" expand to full size")
expandSelect(0, 0, 1, 0, 0, 0, 1)
copy(pw3, pr3)
    * project
pause(" clip original to mask")
and(pr2, pr1, pr3)
copy(pw2, pr2)
    * reduce to show
pause(" reduce 2x to show")
reduceSelect(1, 1, 1, 0, 0, 0, 2)
xor(pr4, pr1, pr3)
copy(pw4, pr4)
subtract(pr5, pr1, pr3)
```

TABLE 2-continued

Program For Separation of Handwritten
Annotation and Machine Printed Text
(Second Embodiment)

```
copy(pw5, pr5)
```

( © Copyright 1991, Xerox Corporation)

TABLE 3

Actions Taken by Interpreted Text Script

| Script Call Name | Associated "C" Procedure |
|---|---|
| dialate, erode : | C procedure calls with the same name. |
| reduceSelect, expandSelect : | C procedure calls with the same name. |
| open, close : | openPr, closePr |
| copy : | opPrPw(destination, source, COPY) |
| xor2 : | opPrPr(destination, source, XOR) |
| xor : | logOp(destination, source1, source2, XOR) |
| subtract : | logOp(destination, source1, source2, SUBTRACT) |
| and : | logOp(destination, source1, source2, INTERSECTION) |
| fillclip : | fillClip(destination, seed, clipmask, TO_COMPLETION, 100 |
| moveToScale : | moveToSF(scaleFactor) |
| pr : | images |
| pw : | images |

Note that "destination," "source," and "clipmask" are all images.

G. Examples of the Invention

1. First Exemplary Embodiment

Figure 7C:
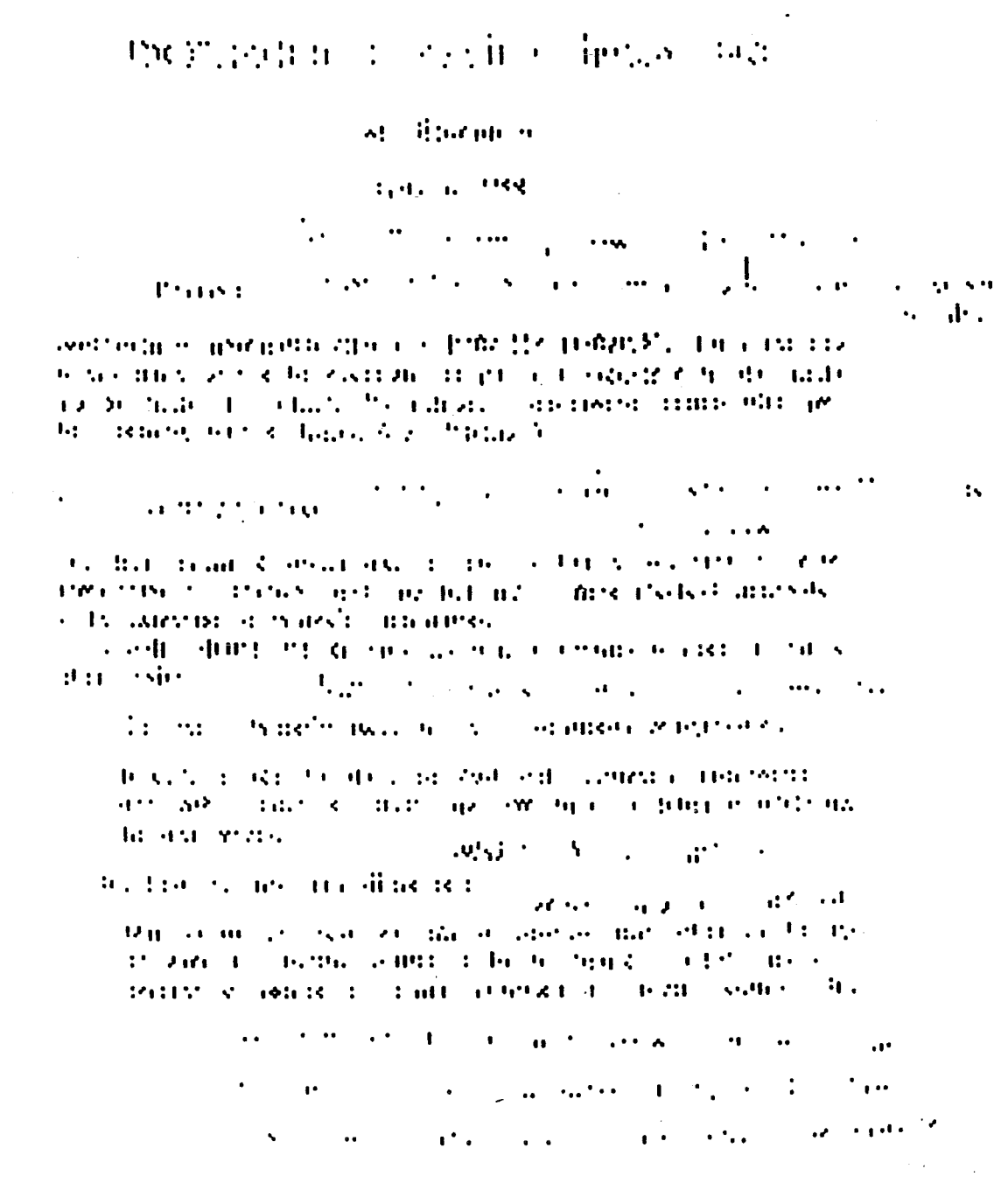
Figure 7D:
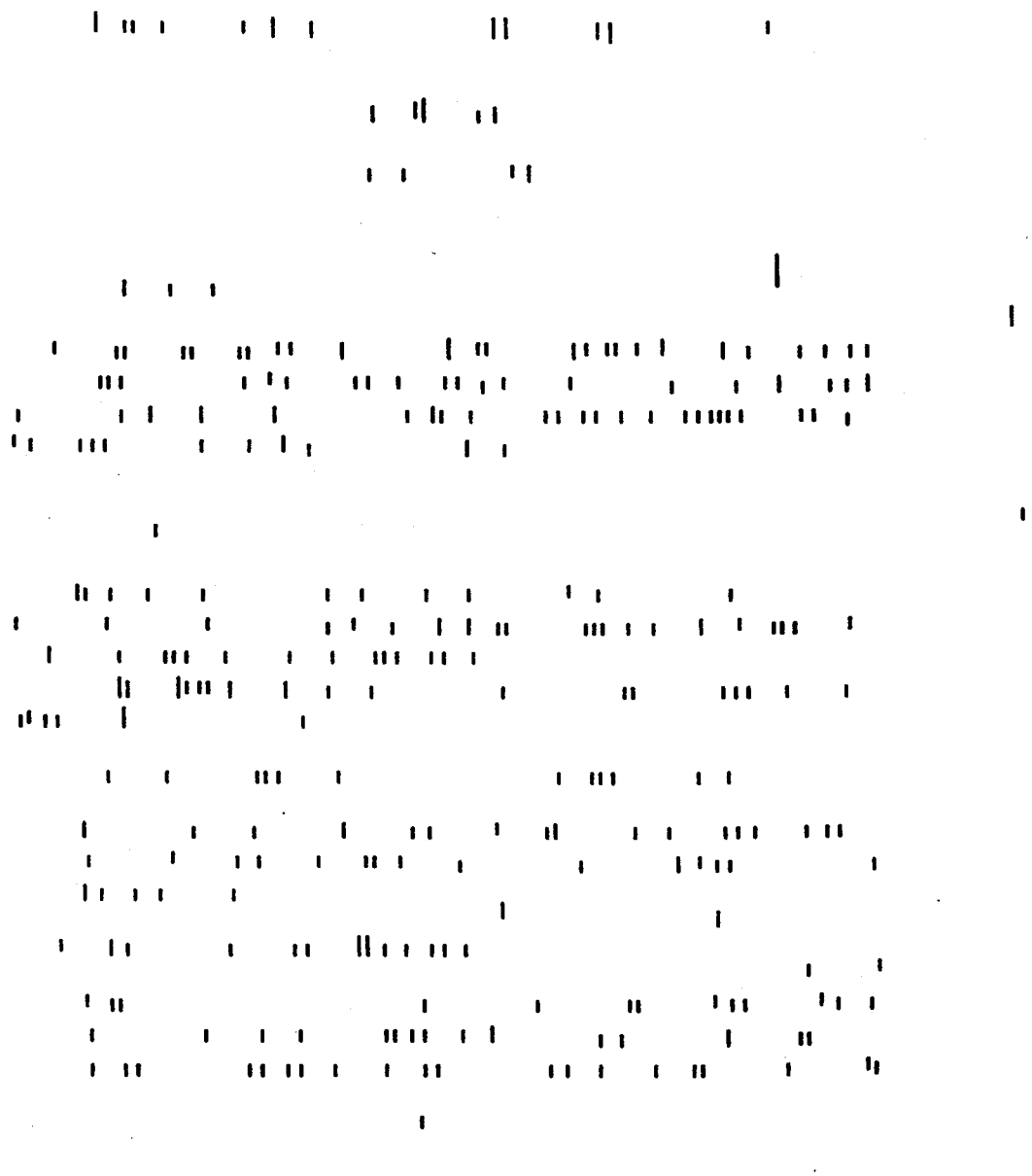

FIGS. 7A to 7K illustrate operation of the first embodiment of the invention. FIG. 7A is an original image containing machine printed text regions as well as a variety of handwriting. The handwriting is in generally small characters, which might be expected to make the handwritten material appear more similar to the machine characters. The image also contains handwriting in five different styles. At the top, the handwriting is in a "fast" print, which is a mixture of printing and writing. In the second sample from the top, purely script handwriting is included. In the third region of handwriting from the top, the handwriting is printed in a small blank space, near machine printed text. In the fourth region of handwriting from the top letters are printed first with messy block capitals, and then with fairly neat block capitals. In the last sample of handwriting (at the bottom), the handwriting is printed more neatly, with reasonably separate characters.

The resolution of the image used for demonstration was 150 pixels/inch. This can be created by scanning at 150 pixels/inch, or by scanning at 300 pixels/inch and reducing by a factor of 2. The particular image shown in FIG. 7A uses the latter, using thresholded reduction with a threshold of 2.

FIG. 7B shows the original image after the reduction steps 302 and 304 in seed formation. As shown, the handwritten annotations tend to contain a lower concentration of ON pixels laterally bounded on both sides by OFF pixels. FIG. 7C shows the image after the CLOSE/XOR steps 306 and 308. The image now contains a relatively small number of ON pixels in regions of handwritten annotations.

FIG. 7D shows the image after the CLOSE/OPEN steps 310 and 312 which are used to remove most of the remaining pixels in the handwritten annotation areas by removing groups of pixels which are not higher than about 1 pixel. The image now contains very few pixels in handwritten annotation areas.

Figure 7E:
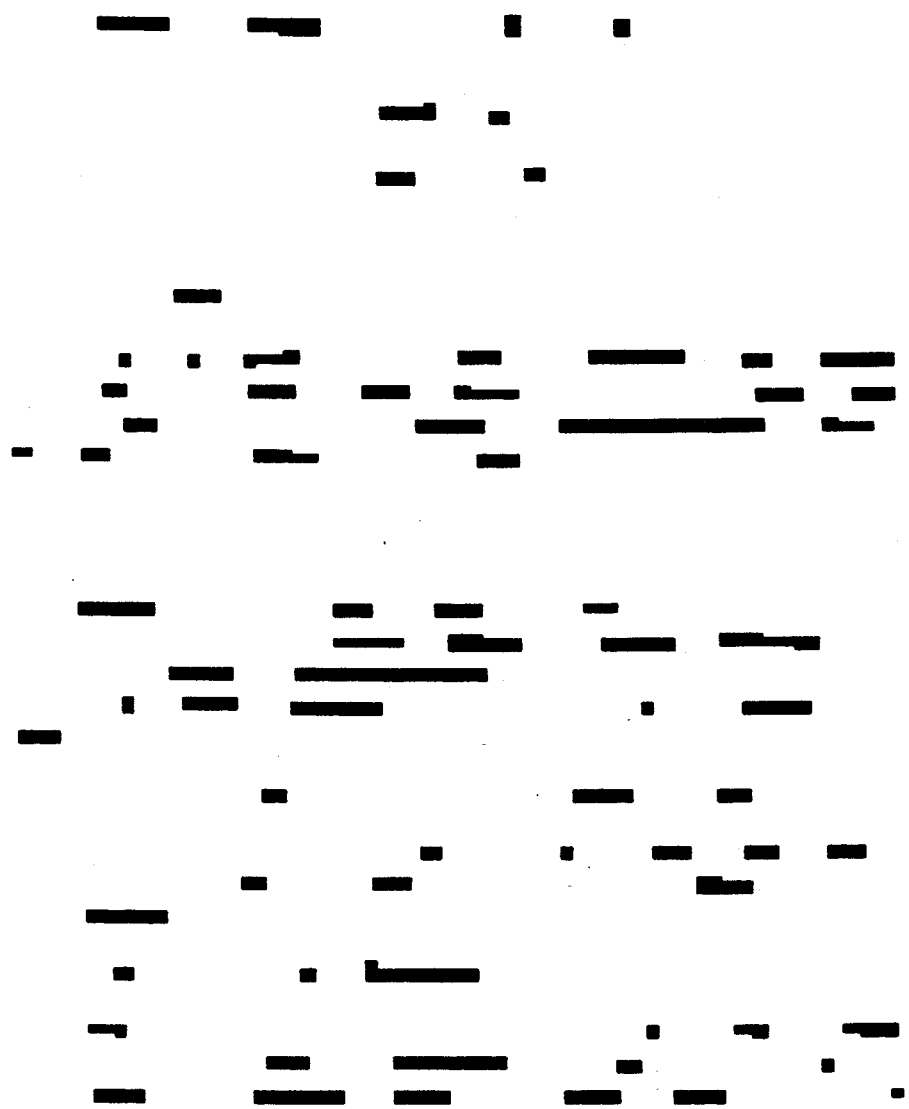

FIG. 7E shows the image after the next set of steps 312 and 314. This CLOSE/OPEN tends to remove any remaining pixels in the handwritten annotation regions and solidify groups of ON pixels, resulting in an image which is used as a seed.

Figure 7F:
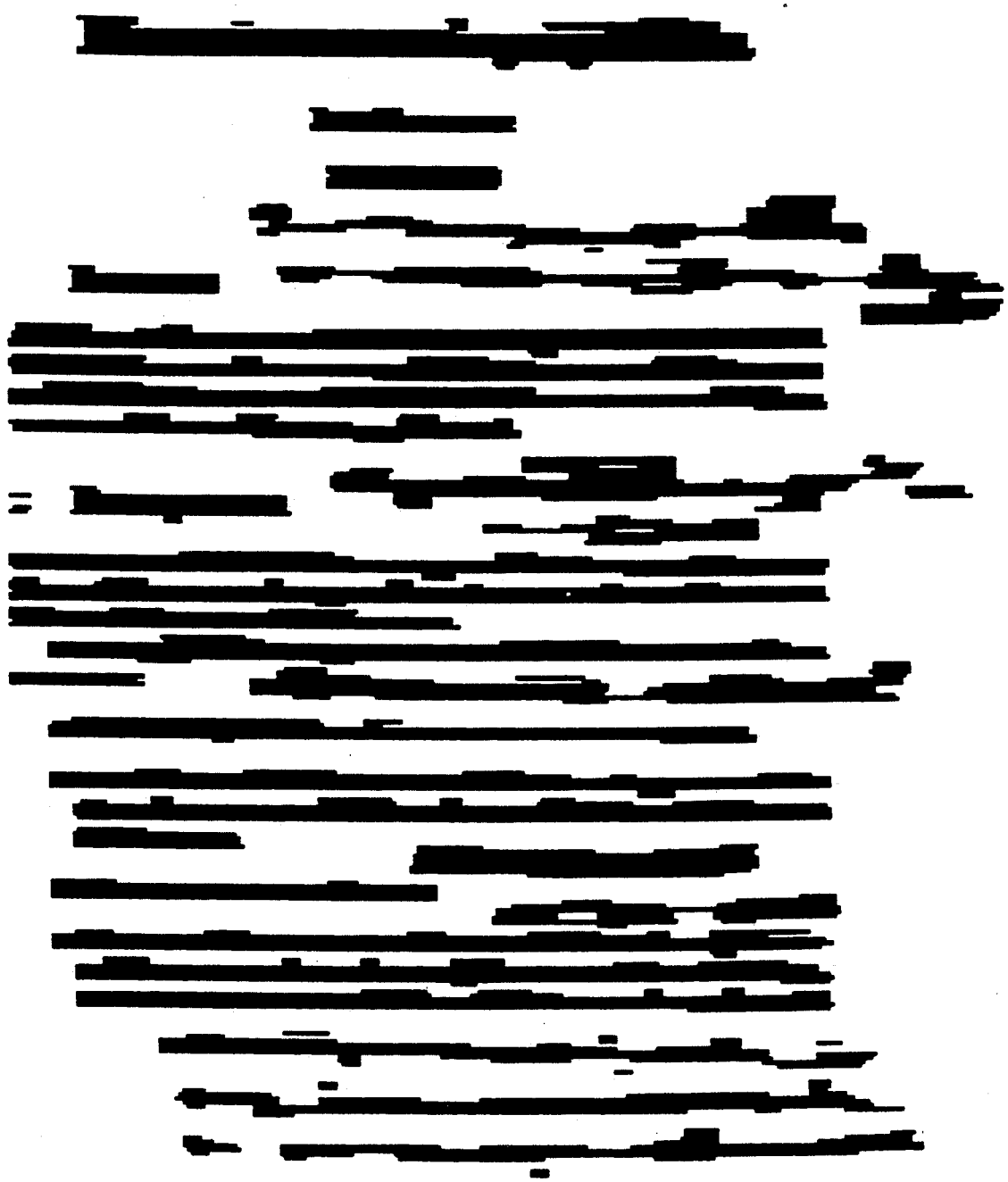

FIG. 7F illustrates the image after formation of the clipping mask with steps 202 to 208. As shown the image contains large regions of ON pixels covering both the handwritten annotations and the machine printed text.

Figure 7G:
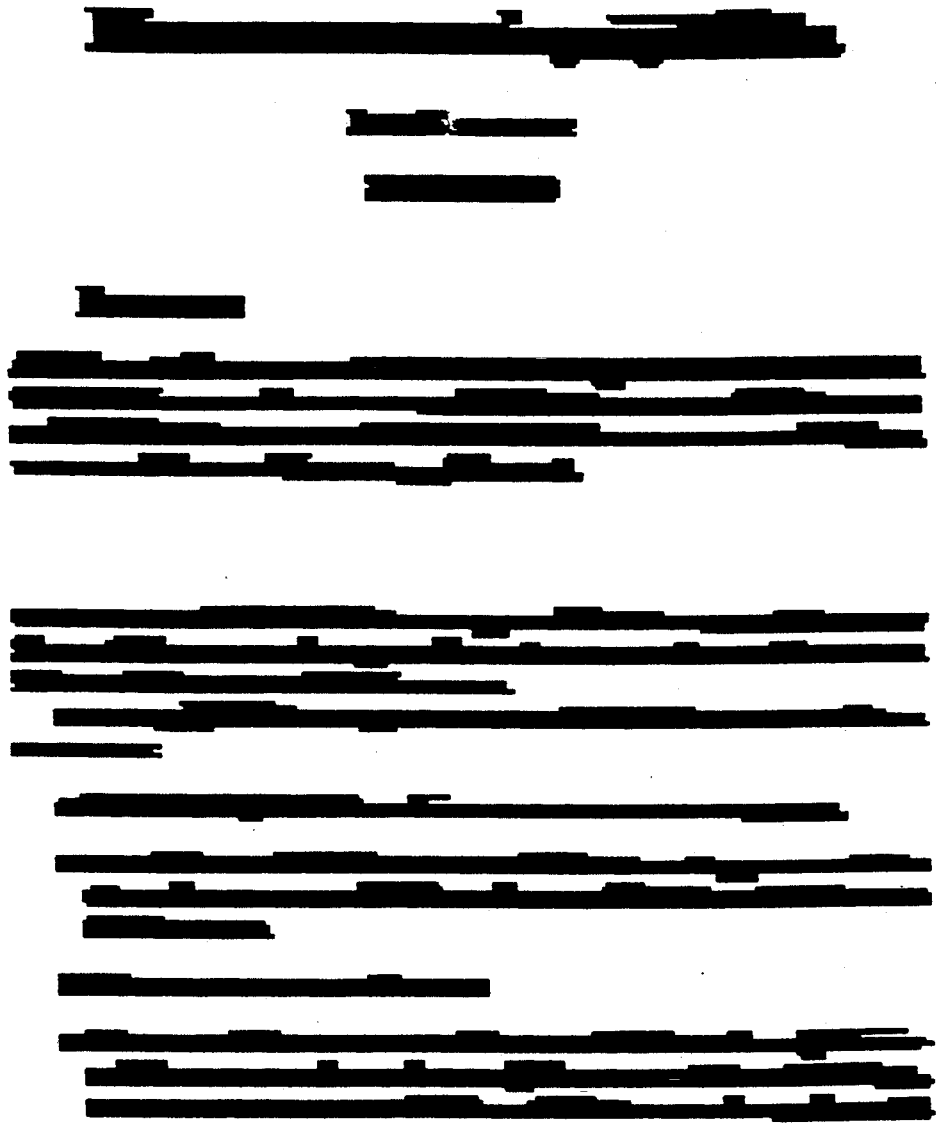
Figure 7H:
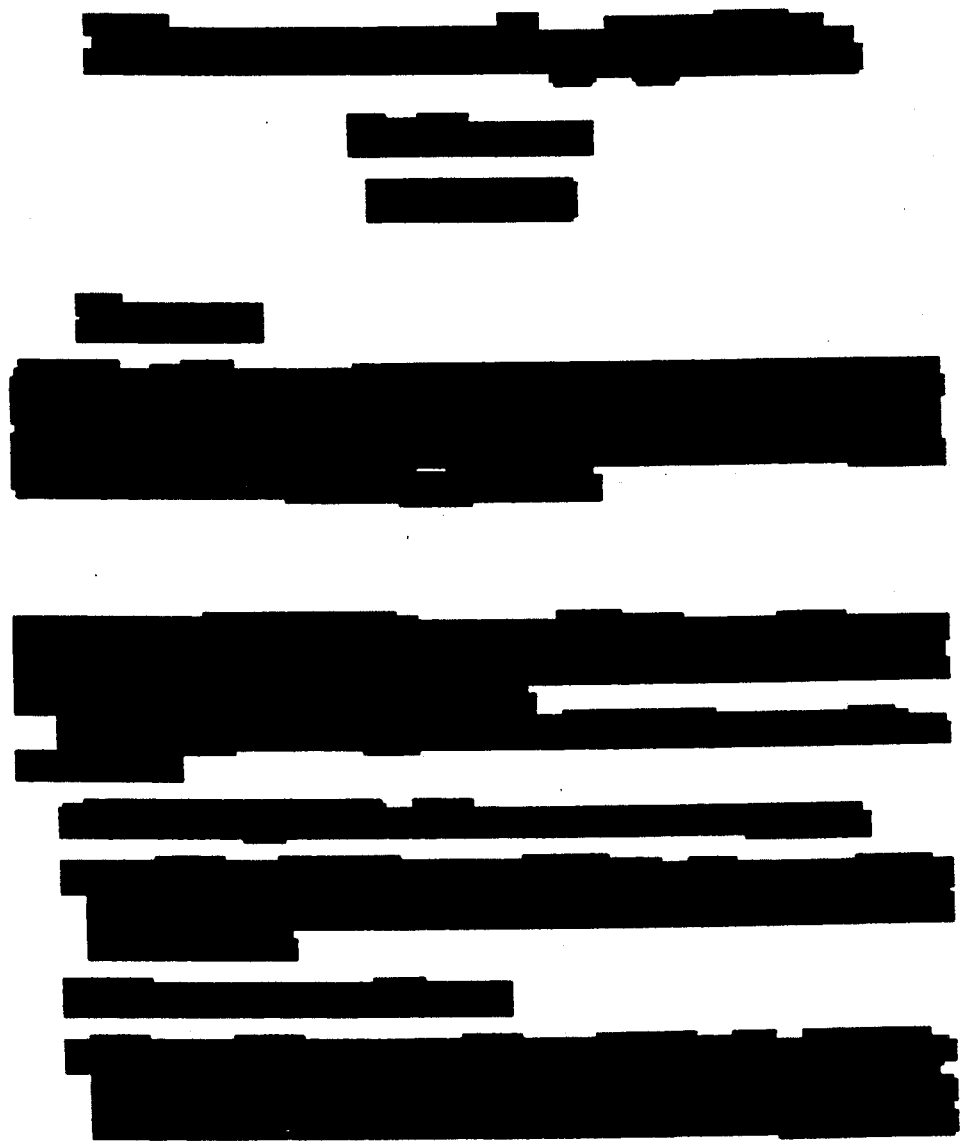

FIG. 7G illustrates the segmentation mask (before the DILATE 409), which is formed by fillclipping the seed to the fillclip mask. As shown, the segmentation mask includes primarily ON pixels covering the desired machine printed areas. As shown in FIG. 7H, a subsequent DILATE results in substantially complete coverage of these regions.

FIG. 7I illustrates the image after extraction of the machine printed text as shown in FIG. 6A. As shown, no handwritten annotations remain. FIG. 7J shows the handwritten annotation image formed as shown in FIG. 6B. As shown therein, the process was almost completely effective in extracting only handwritten annotations. The "1." and "2. Background" were probably insufficiently dense in seed material (due to their relatively large size) for effective separations. FIG. 7K illustrates the image with the identified machine printed text outlined with the segmentation mask.

2. Second Exemplary Embodiment

FIG. 8A shows the same original image reduced twice as shown in steps 502 to 506. For each reduction, a thresholded reduction with a threshold of 2 was utilized. The handwritten and handprinted annotations have a noticeably different texture from the machine printed text at this resolution. This difference is exploited. In particular, the machine printed text has larger density OFF pixels that are surrounded on the left and the right by ON pixels than the handwritten annotations.

Figure 8B:
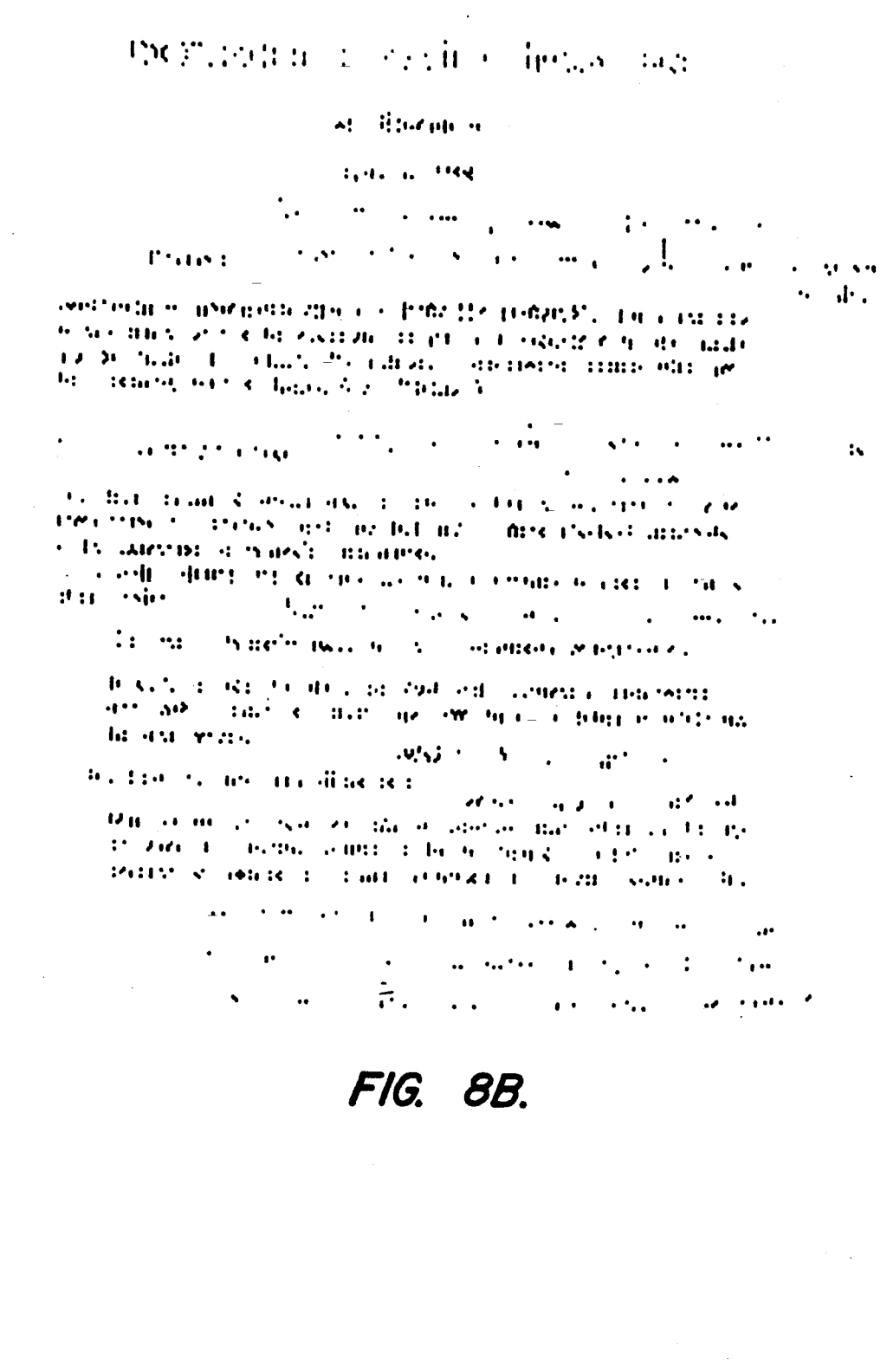

To extract pixels based on this difference, the image is CLOSEd by a horizontal SE of length 2 and then the result is XOR'd with the original reduced image. The resulting image is shown in FIG. 8B. Inspection of FIG. 8B shows that, in fact, the pixels are quite dense in the machine printed part and very sparse in the handwritten part. Note in particular that the pixels in FIG. 8B within the handwritten part are horizontally sparse and vertically are typically only one pixel high.

Figure 8C:
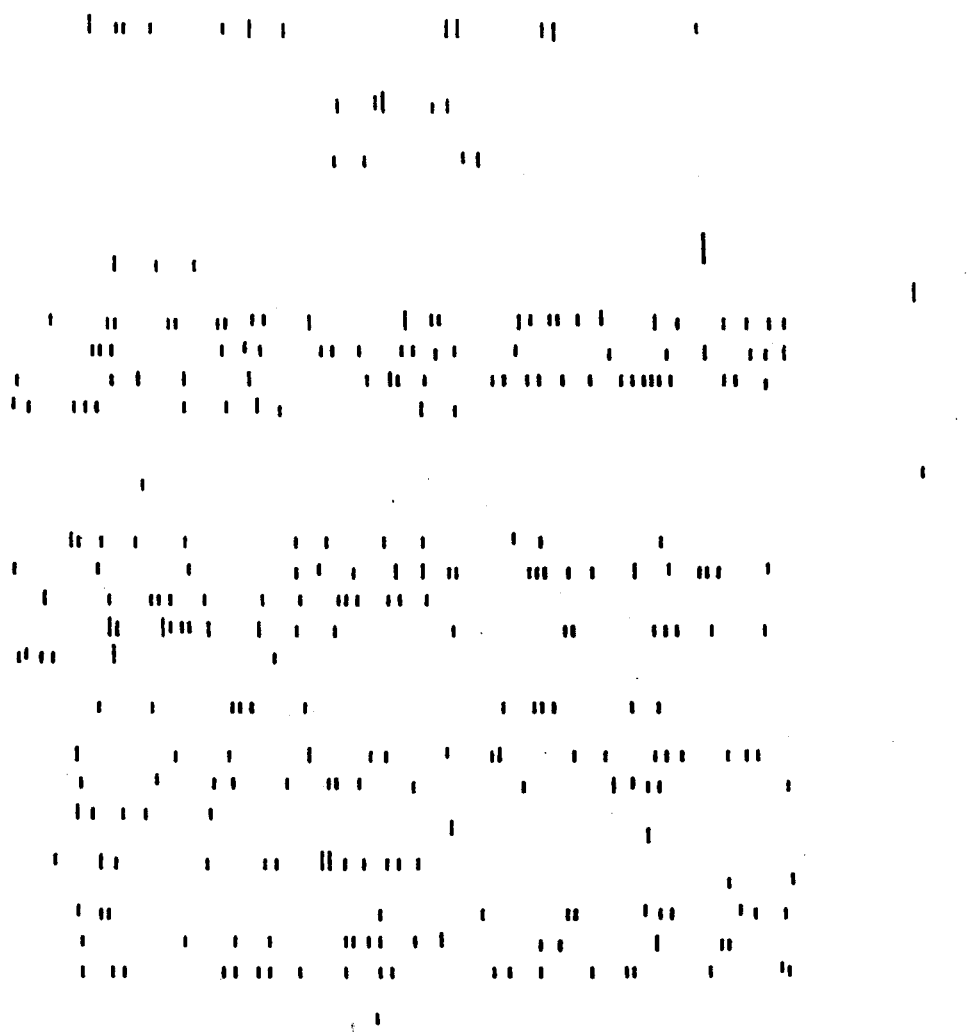

Most of the remaining handwriting pixels are removed to produce the image in FIG. 8C by doing the following two operations:

1. CLOSing with a vertical SE of height 2; and
2. OPENing with a vertical SE of height 3.

The reason the first CLOSE is performed is that there are many pixels in the machine printed part that are vertically aligned but separated by a single pixel gap. It is important to join such pixels together before doing the OPEN.

FIG. 8C looks like punch marks in an IBM card. What is significant about this figure is that there are very few pixels in the handwritten regions. Further, the pixels in the machine printed text regions are sufficiently dense that a covering mask may be constructed.

Figure 8D:
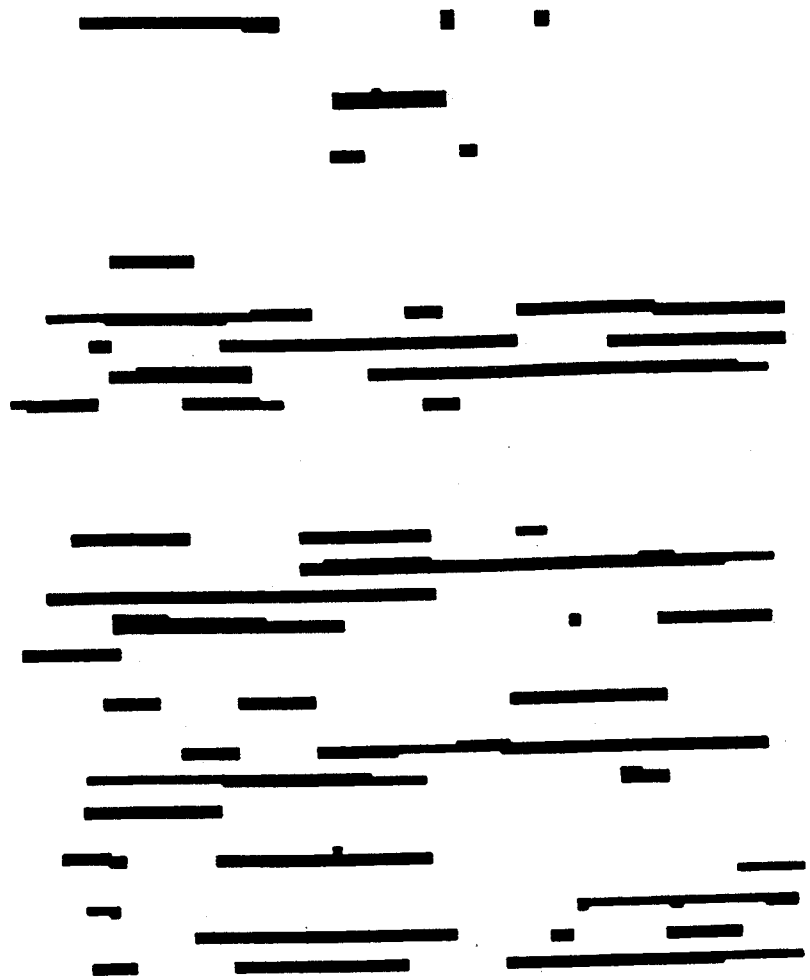

FIG. 8D illustrates the image after the next series of steps. It was produced by doing a large horizontal CLOSE (using a SE of length 20), followed by a small horizontal OPEN (using a SE of length 3). The CLOSE makes the long horizontal lines within the machine printed regions, and the OPEN removes the final few pixels that lie within the handwritten regions.

Figure 8E:
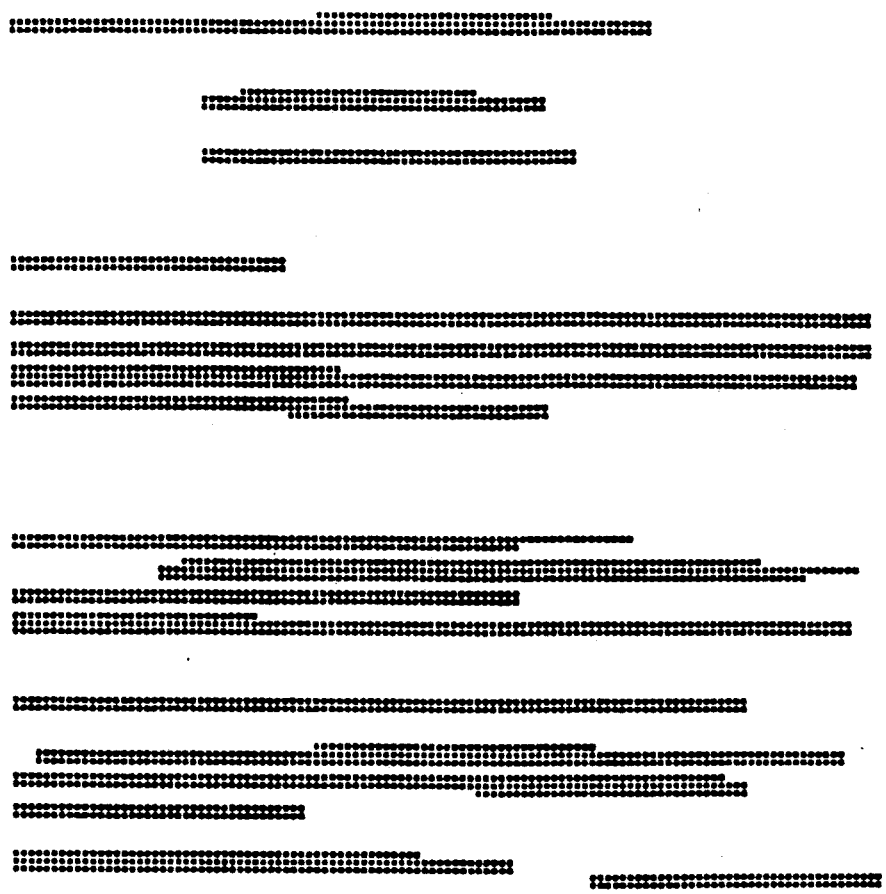

The image is now reduced once more, this time using a threshold of 1, to a resolution of 19 pixels/inch. This is followed by morphological operations with very large SEs. Large SEs are used because it is necessary to produce, starting with the pixels in FIG. 7D, a mask that covers all the machine printed text. This is accomplished by OPENing with a 7, large horizontal SE (of length 50), followed by a DILATION by a horizontal SE of length 30. The result is shown in FIG. 8E, where the pixels are rendered in a "bigpixel" representation at about 19 pixels/inch, and represent a sampling density of 19 pixels/inch on the original.

This image must now be CLOSEd up vertically, which is done by closing with a vertical SE of height 6. To fill the mask further, a horizontal DILATION with a SE of length 10 is done next, followed by a vertical DILATION with a SE of height 3. This results in the mask shown in FIG. 8F. Again, the pixels shown here correspond to a sampling density of 19 pixels/inch in the original, and they are reproduced at roughly the same density, so that the result appears approximately at the size of the original. Note that a few lines of pixels have been cut off at the bottom of FIGS. 8E and 8F.

Figure 8F:
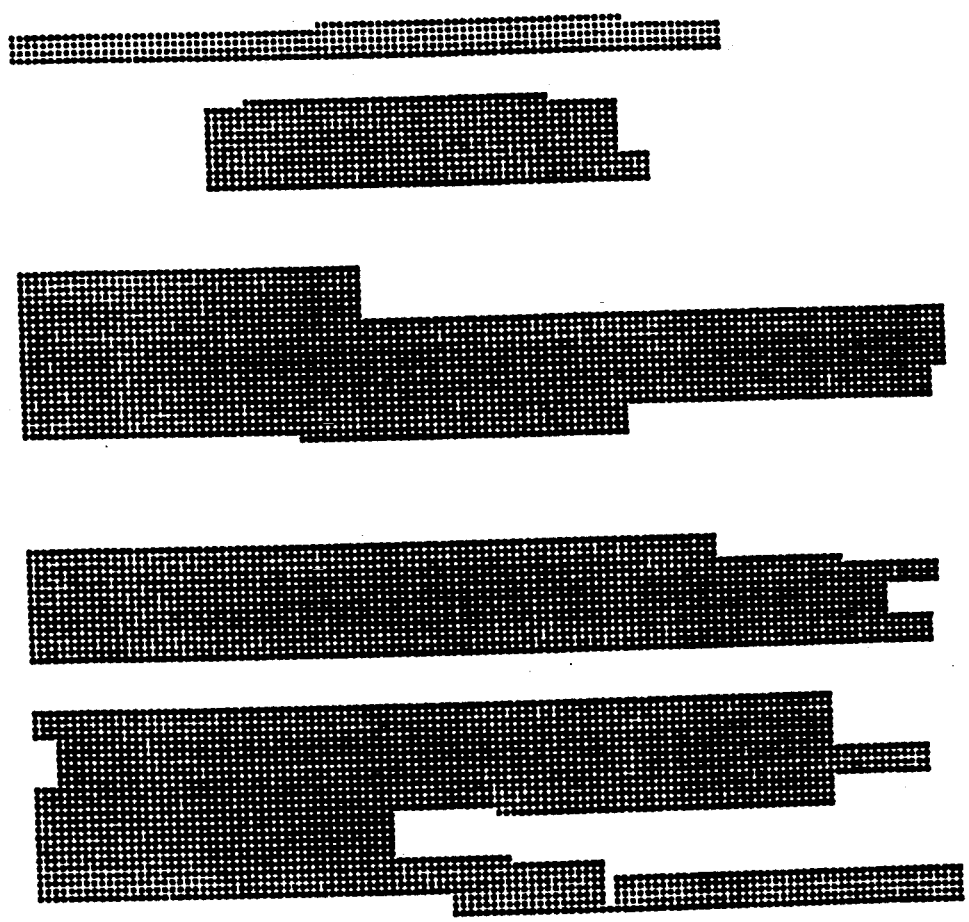

The mask in FIG. 8F is then magnified 8 times, to the original resolution of 150 pixels/inch. FIG. 8G shows the result when this mask is AND'd with the original, extracting most of the machine printed text from the original, along with a little of the handwritten annotations. The handwritten annotations, shown in FIG. 8H, is produced by taking a XOR of FIG. 8G with FIG. 1. FIG. 8F shows a superposition of the original image with the EXPANDed mask for purposes of further illustration of the efficacy of the invention.

H. Conclusion

It has been shown how to separate handwritten annotations from machine printed text. The separation proceeds in two phases: 1) a characteristic difference in textural properties between the two types of writing is used to create an image that has ON pixels only in regions where there was machine printed text; and 2) this image is then processed to create a solid mask over those regions.

Morphological operations and thresholded reductions have been used herein in preferred embodiments. Moreover, all or substantial portions of an image are processed substantially simultaneously in preferred embodiments. The morphological operations used herein have several special properties that simplify their use in the design of appropriate image processing techniques. First, they are substantially translationally invariant. A sideways shift of the image before transforming does not change the result, except to shift the result as well. Operations that are translationally invariant can be implemented with a high degree of parallelism, in that each point in the image is treated using the same rule.

It is to be understood that the above description is intended to be illustrative and not restrictive. Many variations of the invention will become apparent to those of skill in the art upon review of this disclosure. For example, while particular morphological operations, SEs, and scales have been illustrated, other sequences, and other sizes and shapes of structuring elements will also give reasonably good results. The above methods are illustrative of the variations which could be implemented by those of skill in the art. The scope of the invention should, therefore, be determined not with reference to the above description, but instead should be determined with reference to the appended claims along with their full scope of equivalents.

What is claimed is:

1. In a digital processing means, a method of identifying handwritten annotation areas of an input image having handwritten annotation areas and machine printed text areas comprising morphologically processing a region of said input image having a plurality of handwritten and machine printed characters to produce a destination image, said destination image identifying substantially only said machine printed text or said handwritten annotations areas, wherein said step of processing further comprises the step of identifying regions of machine printed text or handwritten annotations with a structuring element (SE) which selectively identifies said machine printed text or handwritten annotations to produce a first intermediate image, wherein the step of identifying regions further comprises the steps of:
 a) closing said first intermediate image with an SE having two horizontally adjacent ON pixels to produce a second intermediate image; and
 b) xoring said input image with said second intermediate image.

2. In a digital processing means, a method of identifying handwritten annotation areas of an input image having handwritten annotation areas and machine printed text areas comprising morphologically processing a region of said input image having a plurality of handwritten and machine printed characters to produce a destination image, said destination image identifying substantially only said machine printed text or said handwritten annotations areas, wherein said step of processing further comprises the step of identifying regions of machine printed text or handwritten annotations with a structuring element (SE) which selectively identifies said machine printed text or handwritten annotations to produce a first intermediate image, and further comprising the steps of:
 a) closing said first intermediate image with a SE having at least two vertically adjacent ON pixels;
 b) openings said first intermediate image with a SE having at least two vertically adjacent ON pixels.

3. In a digital processing means, a method of identifying handwritten annotation areas of an input image having handwritten annotation areas and machine printed text areas comprising morphologically processing a region of said input image having a plurality of handwritten and machine printed characters to produce a destination image, said destination image identifying substantially only said machine printed text or said handwritten annotations areas, wherein said step of processing further comprises the step of identifying regions of machine printed text or handwritten annotations with a structuring element (SE) which selectively identifies said machine printed text or handwritten annotations to produce a first intermediate image, and further comprising the step of forming a mask from said first intermediate image by closing and opening said image with SEs having a plurality of laterally adjacent ON pixels to produce a second intermediate image.

4. The method as recited in claim 3 further comprising the steps of:
 a) performing a thresholded reduction of said second intermediate image;
 b) opening the output of step a) with a horizontal SE;
 c) dilating the output of step b) with a horizontal SE;
 d) closing the output of step c) with a vertical SE;
 e) dilating the output of step d) with a horizontal SE; and
 f) dilating the output of step e) with a vertical SE.

5. In a digital processing means, a method of identifying handwritten annotation areas of an input image having handwritten annotation areas and machine printed text areas comprising morphologically processing a region of said input image having a plurality of handwritten and machine printed characters to produce a destination image, said destination image identifying substantially only said machine printed text or said handwritten annotations areas, wherein said destination image is a mask, said mask overlaying substantially only said machine printed text areas or handwritten annotation areas, wherein said mask is formed by the steps of:
 a) extracting seed pixels in substantially only handwritten annotation or machine printed text areas; and
 b) filling said seed pixels to a clipping mask, said clipping mask comprising substantially solid regions of ON pixels over said handwritten annotation areas or said machine printed text areas, further comprising the step of forming said clipping mask, the step of forming said clipping mask further comprises the steps of:
  i) closing output of step a) with a horizontal SE; and
  ii) opening output of step b) with a horizontal SE.

6. The method as recited in claim 5 preceded by the step of reducing said input image.

7. The method as recited in claim 5 wherein said close and said open use horizontal SEs with more than three adjacent ON pixels.

8. In a digital processing means, a method of identifying handwritten annotation areas of an input image having handwritten annotation areas and machine printed text areas comprising morphologically processing a region of said input image having a plurality of handwritten and machine printed characters to produce a destination image, said destination image identifying substantially only said machine printed text or said handwritten annotations areas, wherein said destination image is a mask overlaying substantially only said machine printed text areas or said handwritten annotation areas, wherein said mask is formed by the steps of:
 extracting seed pixels in substantially only said handwritten annotation or said machine printed text areas by identifying regions of said image having OFF pixels laterally bounded on each side by ON pixels; and
 filling said seed pixels to a clipping mask, said clipping mask comprising substantially solid regions of ON pixels over said handwritten annotation areas and said machine printed text areas.

9. The method as recited in claim 8 wherein said closing step is preceded by the step of reducing said input image.

10. In a digital processing means, a method of identifying handwritten annotation areas of an input image having handwritten annotation areas and machine printed text areas comprising morphologically processing a region of said input image having a plurality of handwritten and machine printed characters to produce a destination image, said destination image identifying substantially only said machine printed text or said handwritten annotations areas, wherein said destination image is a mask overlaying substantially only said machine printed text areas or said handwritten annotation areas, wherein said mask is formed by the steps of:

extracting seed pixels in substantially only said handwritten annotation or said machine printed text areas by
- a) closing said input image; and
- b) xoring output of step a) with said input image; and filling said seed pixels to a clipping mask, said clipping mask comprising substantially solid regions of ON pixels over said handwritten annotation areas and said machine printed text areas.

11. In a digital processing means, a method of identifying handwritten annotation areas of an input image having handwritten annotation areas and machine printed text areas comprising morphologically processing a region of said input image having a plurality of handwritten and machine printed characters to produce a destination image, said destination image identifying substantially only said machine printed text or said handwritten annotations areas, wherein said destination image is a mask overlaying substantially only said machine printed text areas or said handwritten annotation areas, wherein said mask is formed by the steps of:

extracting seed pixels in substantially only said handwritten annotation or said machine printed text areas by processing said image with a hit-miss SE; and filling said seed pixels to a clipping mask, said clipping mask comprising substantially solid regions of ON pixels over said handwritten annotation areas and said machine printed text areas.

12. In a digital processing means, a method of identifying handwritten annotation areas of an input image having handwritten annotation areas and machine printed text areas comprising morphologically processing a region of said input image having a plurality of handwritten and machine printed characters to produce a destination image, said destination image identifying substantially only said machine printed text or said handwritten annotations areas, wherein said destination image is a mask overlaying substantially only said machine printed text areas or said handwritten annotation areas, wherein said mask is formed by the steps of:

extracting seed pixels in substantially only said handwritten annotation or said machine printed text areas; and filling said seed pixels to a clipping mask, said clipping mask comprising substantially solid regions of ON pixels over said handwritten annotation areas and said machine printed text areas, by the steps of:
- a) storing an input image;
- b) dilating said input image;
- c) anding output from step b) with said clipping mask;
- d) comparing output of step c) with a stored image from step a); and
- e) if said stored image from step a) and said output of step c) differ by more than a predetermined amount, outputting said output of step c) as a mask or, if said stored image from step a) and said output of step c) differ by more than a predetermined amount, repeating to step a) with said output of step c) acting as said input image.

* * * * *